(12) United States Patent
Matsuda et al.

(10) Patent No.: US 12,404,213 B2
(45) Date of Patent: Sep. 2, 2025

(54) COMPOSITION CONTAINING AGGREGATE, BINDER, AND WATER

(71) Applicant: SUMITOMO MITSUI CONSTRUCTION CO., LTD., Tokyo (JP)

(72) Inventors: Taku Matsuda, Tokyo (JP); Akio Kasuga, Tokyo (JP); Ryo Sakamoto, Tokyo (JP)

(73) Assignee: SUMITOMO MITSUI CONSTRUCTION CO., LTD., Tokyo (JP)

( * ) Notice: Subject to any disclaimer, the term of this patent is extended or adjusted under 35 U.S.C. 154(b) by 418 days.

(21) Appl. No.: 18/005,596

(22) PCT Filed: Mar. 31, 2021

(86) PCT No.: PCT/JP2021/013823
§ 371 (c)(1),
(2) Date: Jan. 13, 2023

(87) PCT Pub. No.: WO2022/014108
PCT Pub. Date: Jan. 20, 2022

(65) Prior Publication Data
US 2023/0339810 A1    Oct. 26, 2023

(30) Foreign Application Priority Data

Jul. 17, 2020   (WO) .................. PCT/JP2020/027872

(51) Int. Cl.
C04B 20/00   (2006.01)
C04B 18/06   (2006.01)

(52) U.S. Cl.
CPC ........ C04B 20/0076 (2013.01); C04B 18/067 (2013.01)

(58) Field of Classification Search
CPC ... C04B 20/0076; C04B 18/067; C04B 18/02; C04B 18/021; C04B 18/027; C04B 18/141; C04B 18/142; C04B 18/144; C04B 28/04; C04B 20/008; C04B 28/02; C04B 20/00; C04B 18/14; Y02W 30/91
See application file for complete search history.

(56) References Cited

U.S. PATENT DOCUMENTS

2006/0144299 A1*  7/2006  Takada ................ C04B 28/02
                                              106/671
2020/0115282 A1    4/2020  Matsuda et al.

FOREIGN PATENT DOCUMENTS

| JP | H09-052744 A | 2/1997 |
| JP | 2005-022931 A | 1/2005 |
| JP | 2005-119932 A | 5/2005 |
| JP | 2010-100480 A | 5/2010 |
| JP | 2013-256433 A | 12/2013 |
| JP | 2014-169213 A | 9/2014 |
| JP | 2016-185888 A | 10/2016 |
| JP | 2017-138178 A | 8/2017 |
| WO | WO-2019/003572 A1 | 1/2019 |

OTHER PUBLICATIONS

English Translation of PCTJP2021013823 written opinion. (Year: 2023).*

* cited by examiner

*Primary Examiner* — Anthony J Green
(74) *Attorney, Agent, or Firm* — Foley & Lardner LLP

(57) ABSTRACT

The present invention aims at providing a composition containing aggregate, binder, and water that can achieve a higher degree of both flowability in the fresh state and a limitation of autogenous shrinkage. A composition of the present invention contains binder, aggregate, and water, wherein the aggregate contains: small-diameter aggregate classified into particle diameters of 300 μm or more and less than 1.18 mm; medium-diameter aggregate classified into particle diameters of 1.18 mm or more and less than 4.75 mm; and large-diameter aggregate classified into particle diameters of 4.75 mm or more and 5 mm or less; wherein a ratio of volume of water to a sum of volume of the binder and volume of aggregate having particle diameters of 5 mm or less is 15% or more and 26% or less, and the small-diameter aggregate, the medium-diameter aggregate, and the large-diameter aggregate each have a BET specific surface area of 0.4 (m²/g) or less.

14 Claims, 13 Drawing Sheets

COMPOSITION CONTAINING AGGREGATE, BINDER, AND WATER

CROSS-REFERENCE TO RELATED APPLICATIONS

This application is the U.S. National Stage of PCT/JP2021/013823, filed Mar. 31, 2021, which claims priority to PCT/JP2020/027872, filed Jul. 17, 2020.

TECHNICAL FIELD

The present invention relates to a composition containing aggregate, binder, and water.

BACKGROUND OF THE INVENTION

A composition containing aggregate, binder, and water, such as concrete and mortar, is required to have flowability in the fresh state, limited autogenous shrinkage, as well as sufficient strength. JP2010-100480 discloses a cement composition having good flowability and little autogenous shrinkage.

SUMMARY OF THE INVENTION

The cement composition disclosed in JP2010-100480 can achieve both flowability in the fresh state and a limitation of autogenous shrinkage. The present invention aims at providing a composition containing aggregate, binder, and water that can achieve a higher degree of both flowability in the fresh state and a limitation of autogenous shrinkage.

A composition according to an embodiment of the present invention contains binder, aggregate, and water, wherein the aggregate contains: small-diameter aggregate classified into particle diameters of 300 μm or more and less than 1.18 mm; medium-diameter aggregate classified into particle diameters of 1.18 mm or more and less than 4.75 mm; and large-diameter aggregate classified into particle diameters of 4.75 mm or more and 5 mm or less; wherein a ratio of volume of water to a sum of volume of the binder and volume of aggregate having particle diameters of 5 mm or less is 15% or more and 26% or less, and the small-diameter aggregate, the medium-diameter aggregate, and the large-diameter aggregate each have a BET specific surface area of 0.4 (m$^2$/g) or less.

A composition according to another embodiment of the present invention contains: medium-diameter aggregate classified into particle diameters of 1.18 mm or more and less than 4.75 mm; and large-diameter aggregate classified into particle diameters of 4.75 mm or more and 5 mm or less; wherein a ratio of volume of water to a sum of volume of the binder and volume of aggregate having particle diameters of 5 mm or less is 15% or more and 26% or less, and the medium-diameter aggregate and the large-diameter aggregate each have porosity of 10% or more.

A composition according to yet another embodiment of the present invention contains: small-diameter aggregate classified into particle diameters of 300 μm or more and less than 1.18 mm; medium-diameter aggregate classified into particle diameters of 1.18 mm or more and less than 4.75 mm; and large-diameter aggregate classified into particle diameters of 4.75 mm or more and 5 mm or less; wherein a ratio of volume of water to a sum of volume of the binder and volume of aggregate having particle diameters of 5 mm or less is 15% or more and 26% or less, and in a range of pore radii from 0.01 to 1 μm, the small-diameter aggregate, the medium-diameter aggregate, and the large-diameter aggregate each have a pore radius having a largest differential pore volume in a range from 0.03 to 0.3 μm.

A composition according to yet another embodiment of the present invention contains: small-diameter aggregate classified into particle diameters of 300 μm or more and less than 1.18 mm; medium-diameter aggregate classified into particle diameters of 1.18 mm or more and less than 4.75 mm; and large-diameter aggregate classified into particle diameters of 4.75 mm or more larger and 5 mm or less; wherein a ratio of volume of water to a sum of volume of the binder and volume of aggregate having particle diameters of 5 mm or less is 15% or more and 26% or less, and in a range of pore radii from 0.01 to 1 μm, the small-diameter aggregate, the medium-diameter aggregate, and the large-diameter aggregate each have a pore radius having a largest log differential pore volume in a range from 0.06 to 0.3 μm.

According to these compositions containing aggregate, binder, and water, it is possible to achieve a higher degree of both flowability in the fresh state and a limitation of autogenous shrinkage.

The above and other objects, features and advantages of the present invention will become apparent from the following description with reference to the accompanying drawings which illustrate examples of the present invention.

EXAMPLES

Figure 1A:
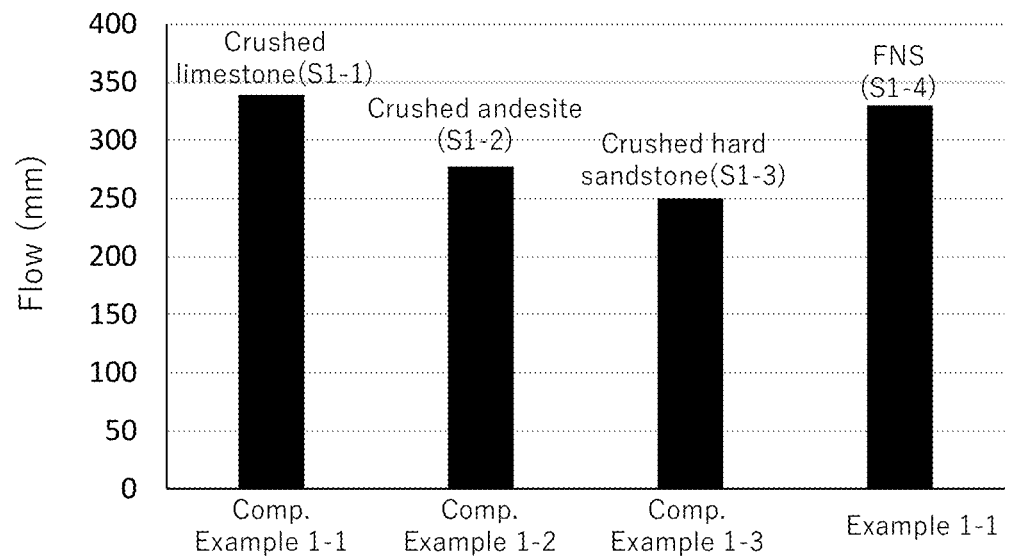
FIG. 1A is a graph showing the flow values of Comparative Examples 1-1 to 1-3 and Example 1-1.

The present invention will now be described based on examples using mortar. The composition containing aggregate, binder, and water of the present invention contains aggregate having particle diameters of 5 mm or less. In the following description, aggregate having particle diameters of 5 mm or less is referred to as fine aggregate.

Table 1 shows the formulation of mortar of Comparative Examples 1-1 to 1-3 and Example 1-1. Table 2 shows the properties of materials that were used. The mortar of Comparative Examples 1-1 to 1-3 and Example 1-1 contains water, binder, fine aggregate, and chemical admixture. Silica fume premix cement and fly ash were used as the binder. Crushed limestone (Comparative Example 1-1), crushed andesite (Comparative Example 1-2), crushed hard sandstone (Comparative Example 1-3), and ferronickel slag sand fine aggregate (hereinafter referred to as FNS fine aggregate) (Example 1-1) were used as the fine aggregate. Pamco Sand manufactured by Pacific Metals Co., Ltd. was used as the FNS fine aggregate. In Table 1, $V_W/(V_B+V_S)$ means the ratio of the volume of water to the sum of the volume of the binder and the volume of the aggregate of the particle diameter classes of 5 mm or less (fine aggregate), where $V_W$ is the volume of water, $V_B$ is the volume of the binder, and $V_S$ is the volume of the fine aggregate. The volume of each material can be calculated by dividing the quantity of material per unit volume shown in Table 1 by the density or by the surface-dry-condition density shown in Table 2. The fine aggregate of Comparative Examples 1-1 to 1-3 and Example 1-1 contains fine aggregate having particle diameters of more than 0 mm and 5.0 mm or less. The definition of the particle diameter will be described later.

TABLE 1

| Type | W/B (%) | $V_W/(V_B+V_S)$ (%) | Air (%) | Amount of material per unit volume (kg/m³) | | | | | | | SP (B × %) | DF (B × %) |
| --- | --- | --- | --- | --- | --- | --- | --- | --- | --- | --- | --- | --- |
| | | | | W | SFPC | FA | S1-1 | S1-2 | S1-3 | S1-4 | | |
| Comp. Example 1-1 | 18 | 23 | 3.0 | 180 | 800 | 200 | 1211 | — | — | — | 1.4 | 0.01 |
| Comp. Example 1-2 | | | | | | | — | 1158 | — | — | | |
| Comp. Example 1-3 | | | | | | | — | — | 1158 | — | | |
| Example 1-1 | | | | | | | — | — | — | 1282 | | |

TABLE 2

| | Name & type | Symbol | Properties | Manufacturer, selling agency etc. | Brand |
| --- | --- | --- | --- | --- | --- |
| | Water | W | Tap water | Nagareyama city, Chiba pref. | — |
| Binder (B) | Silica fume premix cement | SFPC | Density: 3.04 g/cm³, Specific surface area: 5780 cm²/g | TAIHEIYO CEMENT CORPORATION | SFPC |
| | Fly ash (Conforming to Type I) | FA | Density: 2.40 g/cm³, Specific surface area: 5300 cm²/g | Yonden Business Co., Inc. | Finash |
| Fine aggregate (S) | Crushed limestone | S1-1 | Saturated surface dried, Density: 2.73 g/cm³, Water absorption rate: 1.38% | Nittetsu Mining Co., Ltd. | — |
| | Crushed andesite | S1-2 | Saturated surface dried, Density: 2.61 g/cm³, Water absorption rate: 2.81% | Koshu Saiseki Co., Ltd. | — |
| | Crushed hard sandstone | S1-3 | Saturated surface dried, Density: 2.61 g/cm³, Water absorption rate: 1.24% | ORES Co., Ltd. | — |
| | Ferronickel slag sand | S1-4 | Saturated surface dried, Density: 2.89 g/cm³, Water absorption rate: 2.91% | Pacific Metals Co., Ltd. | — |
| Chemical admixture | Superplasticizer | SP | Polycarboxylic acid | Sika Ltd. | Sikament 1200N |
| | Defoamer | DF | Ester fatty acid | Sika Ltd. | Sika antiform W |

Figure 1B:
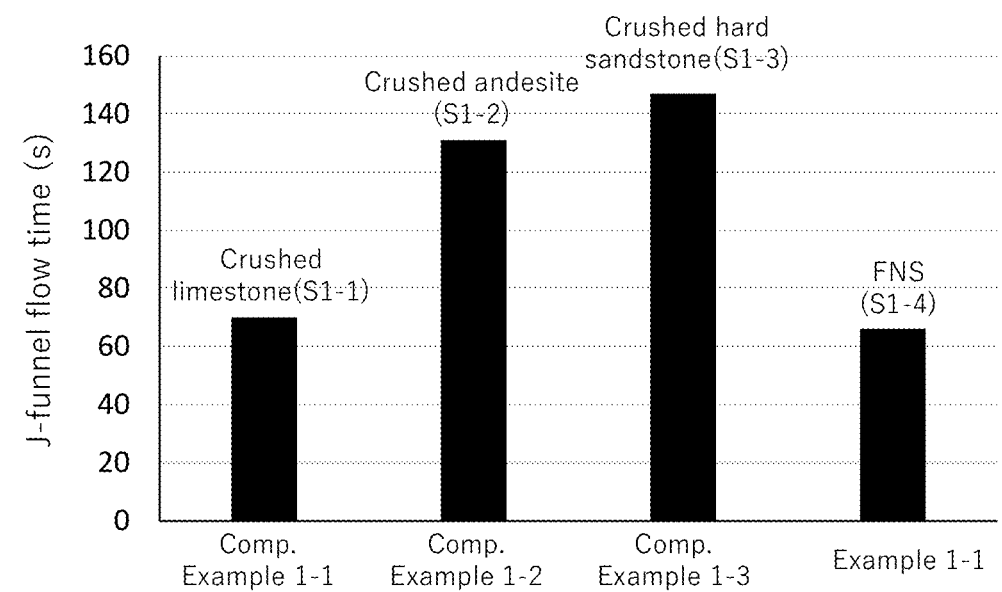
FIG. 1B is a graph showing the J-funnel fall times of Comparative Examples 1-1 to 1-3 and Example 1-1.
Figure 2:
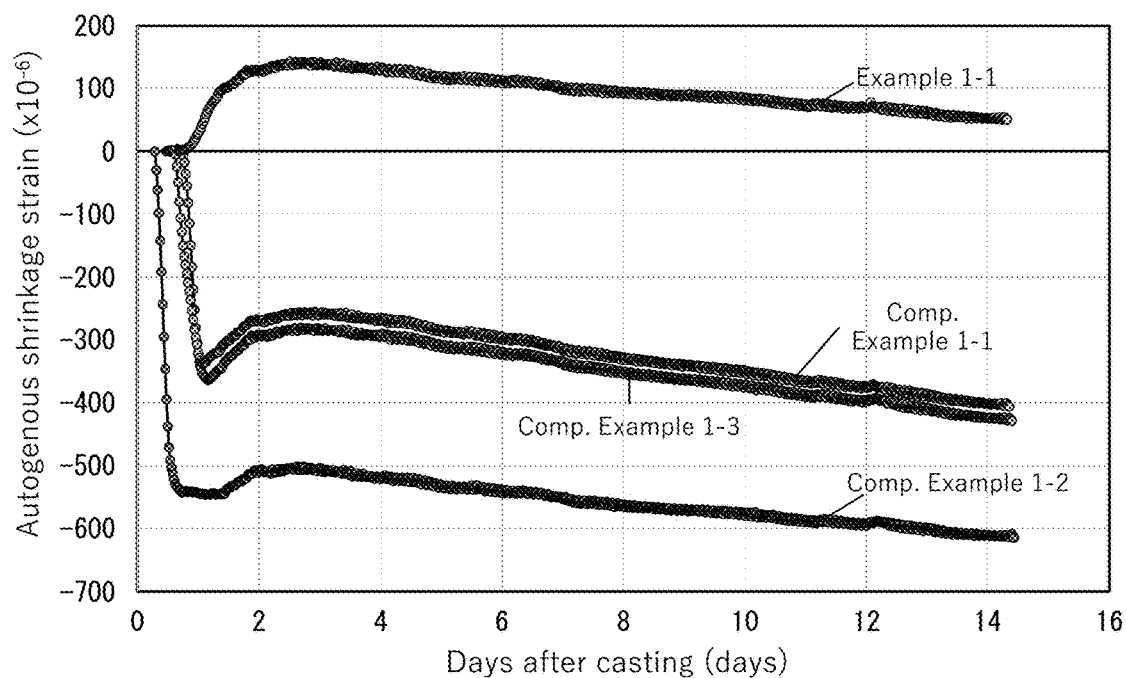
FIG. 2 is a graph showing autogenous shrinkage strain of Comparative Examples 1-1 to 1-3 and Example 1-1.

FIG. 1A shows the flow value of Comparative Examples 1-1 to 1-3 and Example 1-1. FIG. 1B shows the measurements of the J-funnel fall time of Comparative Examples 1-1 to 1-3 and Example 1-1. The flow value was measured in accordance with the flow test of JIS R5201:2015 "Physical testing methods for cement." The J-funnel fall time was measured in accordance with the consistency test method of JHS 312-1999 (Method of testing of and managing quality of non-shrink mortar). This value is an indication of the flowability of mortar in the fresh state, and as the flow value is larger or as the J-funnel fall time is shorter, the flowability is higher. Example 1-1 shows better flowability than Comparative Examples 1-2 and 1-3 (a larger flow value and a shorter fall time) and shows about the same flowability as Comparative Example 1-1. FIG. 2 shows the autogenous shrinkage strain of Comparative Examples 1-1 to 1-3 and Example 1-1. The autogenous shrinkage strain was measured with reference to "Autogenous shrinkage test method for high fluidity concrete" that was shown in "Technical Committee Report on Super Workable Concrete" of the Japan Concrete Institute. Essentially, prism test samples measuring 100×100×400 mm sealed at 20° C. were used as test samples, and the change in the length of test samples from immediately after casting was measured using strain gauges that were embedded in the centers of the test samples. Comparative Example 1-2 showed large autogenous shrinkage immediately after the casting of mortar and a large strain. Comparative Examples 1-1 and 1-3 showed smaller autogenous shrinkage strain than Comparative Example 1-2, but the autogenous shrinkage was still large. On the other hand, Example 1-1 showed strain on the expansion side rather than on the shrinkage side immediately after the casting of mortar. The mortar then gradually shrank but maintained strain on the expansion side about 14 days after the casting.

The fine aggregate of Example 1-1 is air-granulated FNS fine aggregate. Air granulation is a process of blowing high-pressure air into melting slag, which is a by-product that is generated in the process of smelting nickel, thereby separating the slag into fine spherical particles of aggregate and causing the separated particles flying in the air to impinge against a wall. The high-temperature aggregate is slowly cooled while it is flying and is finally solidified into a spherical shape. The FNS fine aggregate thus produced may have a considerably large water absorption rate, and when the FNS fine aggregate is used for a composition containing aggregate, binder, and water, such as mortar and concrete, water that is absorbed is believed to be discharged to cause an "internal curing effect" that limits the autogenous shrinkage of the paste, and thereby limits the autogenous shrinkage while enhancing the flowability.

Table 3 shows the formulation of the mortar of Examples 2-1 and 2-2. Table 4 shows the properties of materials that were used. The BET in Table 4 refers to the measurements that were obtained in accordance with JIS R 1626 "Measuring methods for the specific surface area of fine ceramic powders by gas adsorption using the BET method." The mortar of Examples 2-1 and 2-2 contains water, binder, fine aggregate, and chemical admixture. High-early-strength Portland cement, silica fume, blast-furnace slag, and expansive additive were used as the binder. Air-granulated FNS fine aggregate was used as the fine aggregate. The FNS fine aggregate of Example 2-1 contains fine aggregate having particle diameters of larger than 0 mm and 5.0 mm or less. The FNS fine aggregate of Example 2-2 contains fine aggregate having particle diameters of 300 μm or more and 5.0 mm or less. In other words, the FNS fine aggregate of Example 2-2 contains almost no fine powder having particle diameters of less than 300 μm. It should be noted that the FNS fine aggregate of Examples 2-1 and 2-2 may be commercially available aggregate. Alternatively, the FNS fine aggregate of Example 2-1 may be produced by grinding the FNS fine aggregate of Example 2-2 to generate fine powder having particle diameters of less than 300 μm, or the FNS fine aggregate of Example 2-2 may be produced by removing fine powder having particle diameters of less than 300 μm from the FNS fine aggregate of Example 2-1.

TABLE 3

| Type | W/B (%) | $V_w/(V_B + V_S)$ (%) | Air (%) | Amount of material per unit volume (kg/m³) | | | | | | | SP (B × %) | DF (B × %) |
| --- | --- | --- | --- | --- | --- | --- | --- | --- | --- | --- | --- | --- |
| | | | | W | H | SF | B4 | NEX | S2-1 | S2-2 | | |
| Example 2-1 | 20 | 25 | 4.0 | 190 | 540 | 110 | 281 | 20 | 1271 | — | 3.1 | 0.02 |
| Example 2-2 | | | | | | | | | — | 1218 | 3.1 | 0.02 |

TABLE 4

| | Name & type | Symbol | Properties | Manufacturer, selling agency etc. | Brand |
| --- | --- | --- | --- | --- | --- |
| | Water | W | Tap water | Nagareyama city, Chiba pref. | — |
| Binder (B) | High-early-strength Portland cement | H | Density: 3.14, specific surface area: 4690 cm²/g | TAIHEIYO CEMENT CORPORATION | — |
| | Silica fume | SF | Density: 2.26, BET specific surface area: 2.26 m²/g | TOMOE Engineering Co., Ltd. | EFACO |
| | Blast-furnace slag fine powder | B4 | Density: 2.89, specific surface area: 4270 cm²/g | DC CO., LTD. | Cerament A |
| | Expansive additive | NEX | Density: 3.17, specific surface area: 4970 cm²/g | TAIHEIYO CEMENT CORPORATION | NEX |
| Fine aggregate (S) | Ferronickel slag-sand | S2-1 | Density: 2.85, water absorption rate: 2.81 | Pacific Metals Co., Ltd. | air-dried, particle dia. 0~5.0 mm |
| | Ferronickel slag sand | S2-2 | Density: 2.73, water absorption rate: 4.14 | | air-dried, particle dia. 300 μm~5.0 mm |
| Chemical admixture | Superplasticizer | SP | polycarboxylic acid | BASFJapan Co. Ltd | Master Glenium SP8HU |
| | Defoamer | DF | Polyalkylene glycol derivative | BASFJapan Co. Ltd | Master Air 404 |

Figure 3:
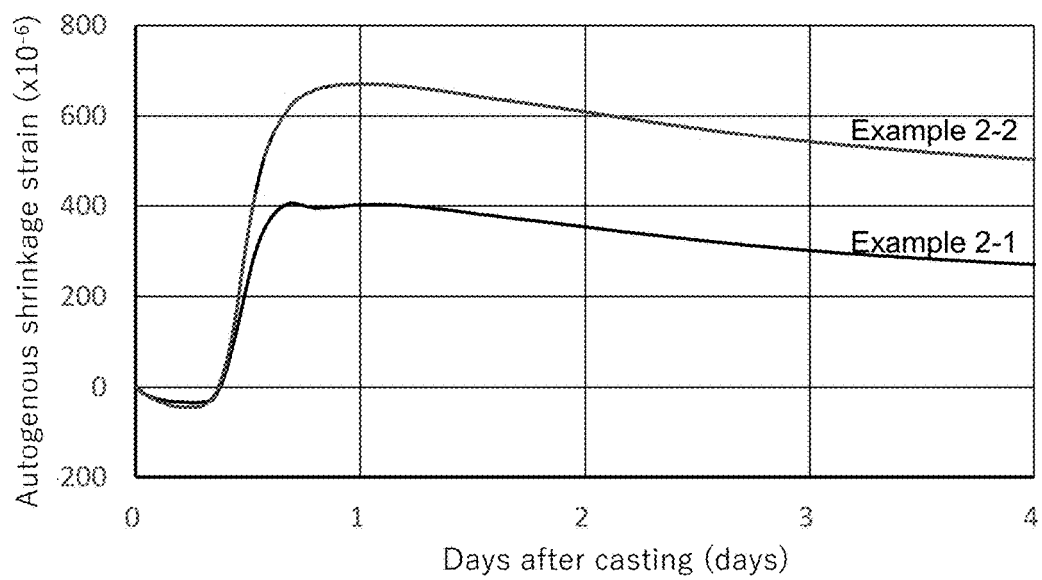
FIG. 3 is a graph showing the temporal change in the autogenous shrinkage strain of Examples 2-1 and 2-2.

Table 5 shows the measurements of the flow value and the J-funnel fall time of Examples 2-1 and 2-2. The flow value and the J-funnel fall time were measured by the same method as in Comparative Examples 1-1 to 1-3 and Example 1-1. As shown in Table 4, Examples 2-1 and 2-2 have the same formulation other than whether the FNS fine aggregate contains fine powder having particle diameters of less than 300 μm. Example 2-2 shows better flowability than Example 2-1. In other words, better flowability can be obtained by using FNS fine aggregate that contains almost no fine powder having particle diameters of less than 300 μm. FIG. 3 shows the autogenous shrinkage strain of Examples 2-1 and 2-2. Both Examples 2-1 and 2-2 showed strain on the expansion side immediately after the casting of mortar rather than on the shrinkage side. The mortar then gradually shrank, but Example 2-2 showed a larger strain on the expansion side and a further limitation of long-term autogenous shrinkage.

3-2 and 3-4 contains almost no fine powder having particle diameters of less than 300 μm. In addition, the FNS fine aggregate of Examples 3-1 and 3-2 is air-dried (a condition in which the surface of the aggregate and a portion of the pores are dry) while the FNS fine aggregate of Examples 3-3 and 3-4 is saturated surface dried (a condition in which the surface of the aggregate is dry but the internal cavities are filled with water). Table 8 shows the measurements of the flow value and the J-funnel fall time of Examples 3-1 to 3-4. The flow value and the J-funnel fall time were measured in the same manner as in Comparative Examples 1-1 to 1-3 and Example 1-1. Examples 3-2 and 3-4 showed better flowability than Examples 3-1 and 3-3, respectively, because the former contains almost no fine powder having particle diameters of less than 300 μm. Comparing Example 3-1 and 3-2, Example 3-1 contains fine powder having particle diameters of less than 300 μm while Example 3-2 contains almost no fine powder having particle diameters of less than

TABLE 5

| Type | Flow (mm) | J funnel fall time (s) | Mortar temp. (° C.) | Room temp. (° C.) | Relative humidity RH (%) | Ferro-nickel slag Fine aggregate |
|---|---|---|---|---|---|---|
| Example 2-1 | 275 | 74.7 | 25.7 | 18.9 | 81 | w/fine powder (<0.3 mm) |
| Example 2-2 | 300 | 53.2 | 24 | 18.3 | 78 | wo/fine powder (<0.3 mm) |

Table 6 shows the formulation of the mortar of Examples 3-1 to 3-4. Table 7 shows the properties of materials that were used. The BET in Table 6 refers to measurements that were obtained in accordance with JIS R 1626 "Measuring methods for the specific surface area of fine ceramic powders by gas adsorption using the BET method." The mortar of Examples 3-1 to 3-4 contains water, binder, fine aggregate, and chemical admixture. Low-heat Portland cement, fly ash, and silica fume were used as the binder. Air-granulated FNS fine aggregate was used as the fine aggregate. The FNS fine aggregate of Examples 3-1 and 3-3 contains fine aggregate having particle diameters of more than 0 mm and 5.0 mm or less. The FNS fine aggregate of Example 3-2 and 3-4 contains fine aggregate having particle diameters of 300 μm or more and 5.0 mm or less. Examples 300 μm, and Example 3-1 contains a larger amount of superplasticizer than Example 3-2. Therefore, if Example 3-1 contained the same amount of the superplasticizer as Example 3-2, the flowability of Example 3-1 would decrease and the difference in flow value between Example 3-2 and Example 3-1 would increase. In addition, comparing Examples 3-2 and 3-4, little difference was observed in the flow value between the saturated surface dried condition and the air-dried condition. In other words, the flowability of mortar that contains FNS fine aggregate that contains almost no fine powder having particle diameters of less than 300 μm is not largely affected by the presence of water in the fine aggregate.

TABLE 6

| Type | W/B (%) | $V_w/(V_B + V_S)$ (%) | Air (%) | Amount of material per unit volume (kg/m³) | | | | | | | SP (B × %) | DF (B × %) |
|---|---|---|---|---|---|---|---|---|---|---|---|---|
| | | | | W | L | FA | SF | S3-1 | S3-2 | S3-3 | S3-4 | | |
| Example 3-1 | 17 | 23 | 4.0 | 180 | 801 | 169 | 80 | 1213 | — | — | — | 2.35 | 0 |
| Example 3-2 | | | | | | | | — | 1166 | — | — | 1.4 | 0 |
| Example 3-3 | | | | | | | | — | — | 1247 | — | | 0 |
| Example 3-4 | | | | | | | | — | — | — | 1208 | | 0 |

TABLE 7

| | Name & type | Symbol | Properties | Manufacturer, selling agency etc. | Brand |
|---|---|---|---|---|---|
| | Water | W | Tap water | Nagareyama city, Chiba pref. | — |
| Binder (B) | Low-heat Portland cement | L | Density: 3.24, specific surface area: 3760 cm²/g | Sumitomo Osaka Cement Co., Ltd. | Low-heat Portland cement |
| | Fly ash | FA | Density: 2.40, specific surface area: 5590 cm²/g | Yonden Business Co., Inc. | Finash |
| | Silica fume | SF | Density: 2.26, BET specific surface area: 22.3 m²/g | TOMOE Engineering Co., Ltd. | EFACO |

TABLE 7-continued

| Name & type | | Symbol | Properties | Manufacturer, selling agency etc. | Brand |
|---|---|---|---|---|---|
| Fine aggregate (S) | Ferronickel slag sand | S3-1 | Density: 2.84, water absorption rate: 2.81 | Pacific Metals Co., Ltd. | Air-dried, particle dia. 0~5.0 mm |
| | | S3-2 | Density: 2.73, water absorption rate: 4.14 | | Air-dried, particle dia. 0.3~5.0 mm |
| | | S3-3 | Density: 2.92, water absorption rate: 2.81 | | Saturated surface dried, particle dia. 0~5.0 mm |
| | | S3-4 | Density: 2.83, water absorption rate: 4.14 | | Saturated surface dried, particle dia. 0.3~5.0 mm |
| Chemical admixture | Superplasticizer | SP | polycarboxylic acid | BASF Japan, Co., Ltd. | Master Glenium SP8HU |
| | Defoamer | DF | Polyalkylene glycol derivative | BASF Japan, Co., Ltd. | Master Air 404 |

TABLE 8

| Type | Flow (mm) | J funnel fall time (s) | Mortar temp. (° C.) | Room temp. (° C.) | Relative humidity RH | Ferro-nickel slag Fine aggregate |
|---|---|---|---|---|---|---|
| Example 3-1 | 303 | 130 | 30.9 | 22.5 | 70 | air-dried, particle dia. 0~5.0 mm |
| Example 3-2 | 325 | 90.3 | 31.2 | 22.4 | 68 | air-dried, particle dia. 0.3~5.0 mm |
| Example 3-3 | 284 | 165.4 | 29.5 | 22.5 | 68 | Saturated surface dried, particle dia. 0~5.0 mm |
| Example 3-4 | 327 | 72.9 | 27.6 | 22.6 | 70 | Saturated surface dried, particle dia. 0.3~5.0 mm |

Figure 4:
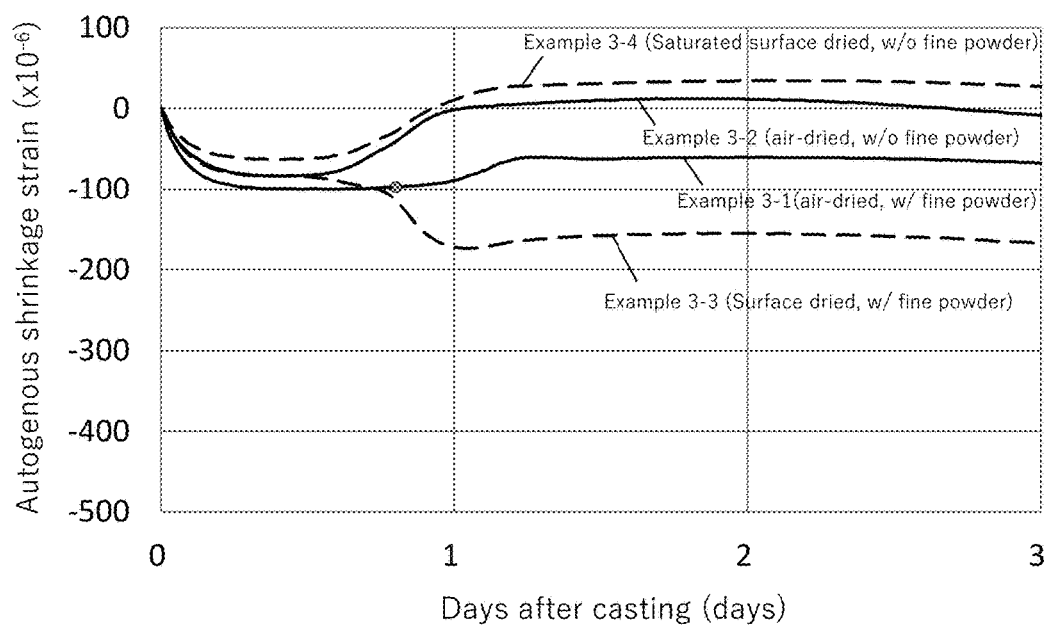
FIG. 4 is a graph showing the temporal change in the autogenous shrinkage strain of Examples 3-1 to 3-4.

FIG. 4 shows the autogenous shrinkage strain of Examples 3-1 to 3-4. Examples 3-1 to 3-4 showed small strain on the shrinkage side immediately after the casting of mortar. Then, Examples 3-1, 3-2, and 3-4 showed strain on the expansion side while Example 3-3 still showed strain on the shrinkage side. Comparing examples having air-dried FNS fine aggregate, Example 3-2 showed less autogenous shrinkage than Example 3-1. Comparing examples having saturated surface dried FNS fine aggregate, Example 3-4 showed less autogenous shrinkage than Example 3-3. Comparing Examples 3-2 and 3-4, the strain was not largely affected by whether the FNS fine aggregate was air-dried or saturated surface dried.

Table 9 shows the formulation of concrete of Comparative Example 4A and Examples 4A-1 to 4A-3. Table 10 shows the properties of materials that were used. The BET in Table 10 refers to the measurements that were obtained in accordance with JIS R 1626 "Measuring methods for the specific surface area of fine ceramic powders by gas adsorption using the BET method." The concrete of Comparative Example 4A and Examples 4A-1 to 4A-3 contains water, binder, fine aggregate, coarse aggregate, and chemical admixture. Ordinary Portland cement, blast-furnace slag fine powder, and silica fume were used as the binder. Crushed hard sandstone (Comparative Example 4A) and artificial light-weight fine aggregate (Examples 4A-1 to 4A-5) were used as the fine aggregate. Mesalite manufactured by Nippon Mesalite Industry Co., Ltd. was used as the artificial light-weight fine aggregate. Table 11 shows the measurements of the slump flow of Comparative Example 4A and Examples 4A-1 to 4A-3. The slump flow value was measured in accordance with JIS A1150:2014 "Method of test for the slump flow of concrete." "50 cm slump flow time," which is one of the indications of flowability of concrete, refers to the time from immediately after the cone is pulled to the time when the diameter of the concrete reaches 50 cm. Comparative Example 4A had no measurements because the slump flow did not reach 50 cm. Examples 4A-1 to 4A-3 showed better flowability than Comparative Example 4A.

Table 12 shows the formulation of concrete of Examples 4B-1 to 4B-3. Table 13 shows the properties of materials that were used. The materials that were used were substantially the same as used in Examples 4A-1 to 4A-3. The BET specific surface area in Table 13 was measured in the same manner as in Table 10. Table 14 shows the measurements of the slump flow and the 50-cm slump flow time of Examples 4B-1 to 4B-3. The slump flow and the 50-cm slump flow time were measured in the same manner as in Comparative Example 4A and Examples 4A-1 to 4A-3. Examples 4B-1 to 4B-3 each showed good flowability.

TABLE 9

| Type | W/B (%) | $V_w/(V_B + V_S)$ (%) | Air (%) | Amount of material per unit volume (kg/m³) | | | | | | | SP (B × %) | DF (B × %) |
|---|---|---|---|---|---|---|---|---|---|---|---|---|
| | | | | W | NC | B F | S F | S4A-1 | S4A-2 | G | | |
| Example 4A-1 | 20 | 23 | 3.5 | 130 | 273 | 312 | 65 | 625 | 0 | 723 | 0.9 | 0.004 |
| Example 4A-2 | 18 | 25 | | | 274 | 376 | 72 | 517 | 0 | 809 | 0.75 | 0.003 |
| Example 4A-3 | | | | | | | | | | | 1 | |
| Comp. Example 4A | | | | | | | | 0 | 725 | | 0.85 | |

TABLE 10

| | Name & type | Symbol | Properties | Manufacturer, selling agency etc. | Brand |
|---|---|---|---|---|---|
| Binder (B) | Water | W | Tap water | Nagareyama city, Chiba pref. | — |
| | Ordinary Portland cement | NC | Density: 3.16 g/cm$^3$, Specific surface area: 3290 cm$^2$/g | TAIHEIYO CEMENT CORPORATION | Ordinary Portland cement |
| | blast-furnace slag fine powder | BF | Density: 2.89 g/cm$^3$, Specific surface area: 4630 cm$^2$/g | DC CO., LTD. | Cerament A |
| | Silica fume | SF | Density: 2.20 g/cm$^3$, BET specific surface area: 20 m$^2$/g | TOMOE Engineering Co., Ltd. | EFACO |
| Fine aggregate (S) | Crushed hard sandstone | S4A-1 | Saturated surface dried, Density: 2.61 g/cm$^3$, Water absorption rate: 1.08% | ORES Co., Ltd. | — |
| | Artificial light weight fine aggregate | S4A-2 | Saturated surface dried, Density: 1.86 g/cm$^3$, Water absorption rate: 15.5% | Nippon Mesalite Industry Co., Ltd. | Mesalite |
| Coarse aggregate | Crushed stone of hard sandstone | G | Saturated surface dried, Density: 2.64 g/cm$^3$, Water absorption rate: 0.68% | ORES Co., Ltd. | — |
| Chemical admixture | Superplasticizer | SP | Polycarboxylic acid | Sika Ltd. | Sikament 1200N |
| | Defoamer | DF | Ester fatty acid | Sika Ltd. | Sika antiform W |

TABLE 11

| Type | slump Flow (cm) | 50 cm slump flow time (s) | Concrete temp. (° C.) | Room temp. (° C.) |
|---|---|---|---|---|
| Example 4A-1 | 66.8 | 10.3 | 28.2 | 20 |
| Example 4A-2 | 73.3 | 13.7 | 22.8 | |
| Example 4A-3 | 72.3 | 14.2 | 22.7 | |
| Comp. Example 4A | 31.5 | — | 24.1 | |

TABLE 12

| Type | W/B (%) | $V_w/(V_B + V_S)$ (%) | Air (%) | W | NC | BF | SF | S4B | G | SP (B × %) | DF (B × %) |
|---|---|---|---|---|---|---|---|---|---|---|---|
| Example 4B-1 | 18 | 24 | 3.5 | 140 | 296 | 404 | 78 | 567 | 662 | 0.85 | 0.005 |
| Example 4B-2 | 20 | 25 | | | 266 | 364 | 70 | 594 | 693 | 0.8 | |
| Example 4B-3 | 25 | 26 | | | 213 | 291 | 56 | 644 | 750 | 0.75 | |

Column header note: "Amount of material per unit volume (kg/m$^3$)" spans W, NC, BF, SF, S4B, G.

TABLE 13

| | Name & type | Symbol | Properties | Manufacturer, selling agency etc. | Brand |
|---|---|---|---|---|---|
| Binder (B) | Water | W | Tap water | Nagareyama city, Chiba pref. | — |
| | Ordinary Portland cement | NC | Density: 3.16 g/cm$^3$, Specific surface area: 3290 cm$^2$/g | TAIHEIYO CEMENT CORPORATION | Ordinary Portland cement |
| | blast-furnace slag fine powder | BF | Density: 2.89 g/cm$^3$, Specific surface area: 4630 cm$^2$/g | DC CO., LTD. | Cerament A |
| | Silica fume | SF | Density: 2.25 g/cm$^3$, BET specific surface area: 20 m$^2$/g | TOMOE Engineering Co., Ltd. | EFACO |
| Fine aggregate (S) | Artificial light weight fine aggregate | S4B | Saturated surface dried, Density: 1.85 g/cm$^3$, Water absorption rate: 13.6% | Nippon Mesalite Industry Co., Ltd. | Mesalite |
| Coarse aggregate | Crushed stone of hard sandstone | G | Saturated surface dried, Density: 2.64 g/cm$^3$, Water absorption rate: 0.60% | ORES Co., Ltd. | — |
| Chemical admixture | Superplasticizer | SP | Polycarboxylic acid | Sika Ltd. | Sikament 1200N |
| | Defoamer | DF | Ester fatty acid | Sika Ltd. | Sika antiform W |

TABLE 14

| Type | slump Flow (cm) | 50 cm slump flow time (s) | Concrete temp. (° C.) | Room temp. (° C.) |
|---|---|---|---|---|
| Example 4B-1 | 66.15 | 7.6 | 22.1 | 19.7 |
| Example 4B-2 | 58.5 | 7.8 | 21.6 | 20.2 |
| Example 4B-3 | 65.5 | 4.2 | 21.4 | 19.7 |

Figure 5A:
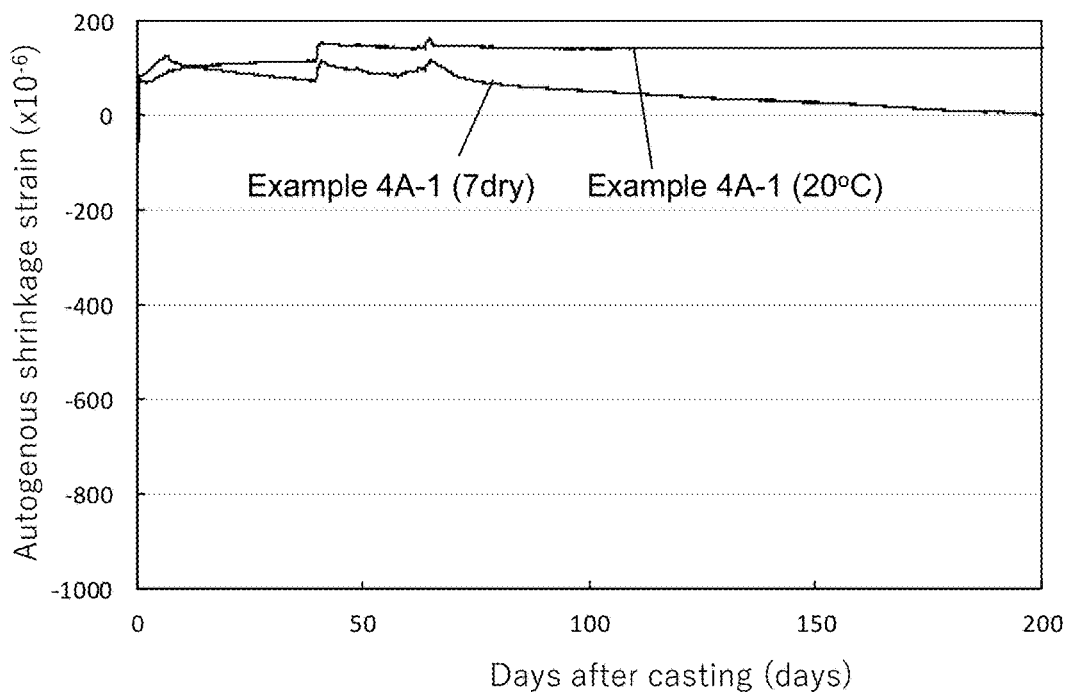
FIG. 5A is a graph showing the temporal change in the autogenous shrinkage strain of Example 4A-1.
Figure 5B:
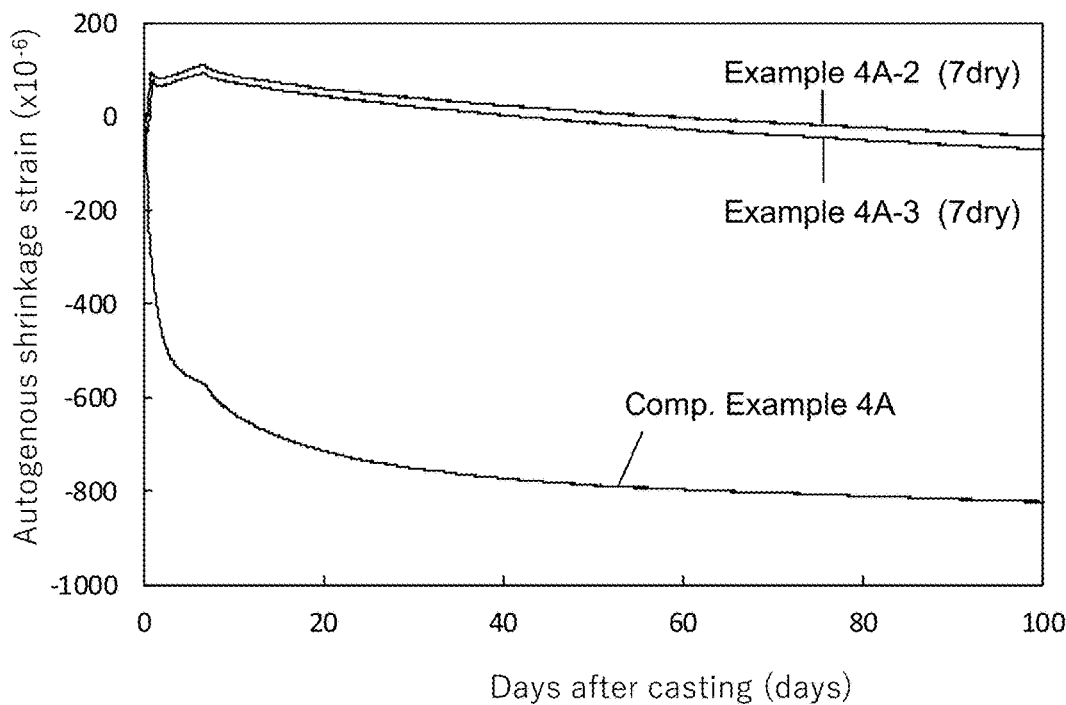
FIG. 5B is a graph showing the temporal change in the autogenous shrinkage strain of Examples 4A-2 and 4A-3 and Comparative Example 4A.
Figure 5C:
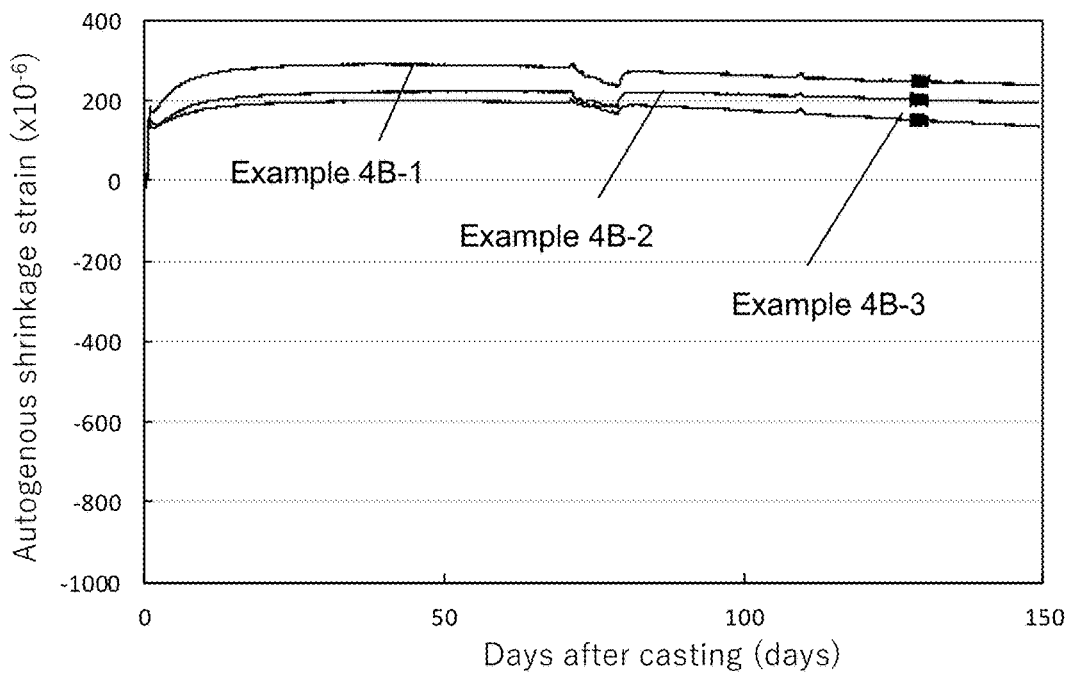
FIG. 5C is a graph showing the temporal change in the autogenous shrinkage strain of Examples 4B-1 to 4B-3.
Figure 5D:
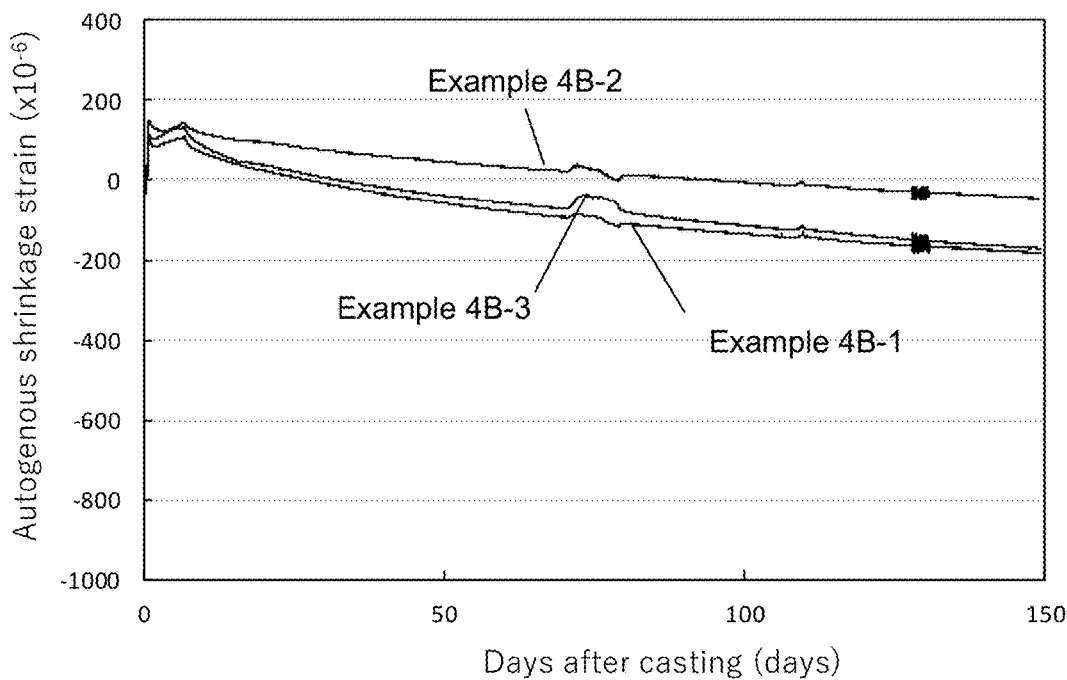
FIG. 5D is a graph showing the temporal change in the autogenous shrinkage strain of Examples 4B-1 to 4B-3.

FIG. 5A shows the autogenous shrinkage strain of Example 4A-1. In the figure, (7 dry) means that the concrete was sealed at 20° C. until the seventh day after casting and then was cured in the atmosphere at 20° C. and 60% RH, and (20° C.) means that the concrete was sealed at 20° C. immediately after the casting as in Comparative Examples 1-1 to 1-3 and Example 1-1. FIG. 5B shows the autogenous shrinkage strain of Examples 4A-2, 4A-3, and Comparative Example 4A. In FIG. 5B, the concrete was sealed at 20° C. until the seventh day after the casting and then was cured in the atmosphere at 20° C. and 60%. FIGS. 5C and 5D show the autogenous shrinkage strain of Examples 4B-1 to 4B-3. In FIG. 5C, the concrete was sealed at 20° C. until the seventh day after casting as in Comparative Examples 1-1 to 1-3 and Example 1-1. In FIG. 5D, the concrete was sealed at 20° C. until the seventh day after the casting and then was cured in the atmosphere at 20° C. and 60% RH. As shown in FIG. 5B, Comparative Example 4A showed great autogenous shrinkage from immediately after the casting of concrete while Examples 4A-1 to 4A-3 and 4B-1 to 4B-3 were on the expansion side after the casting of concrete rather than on the shrinkage side and showed little shrinkage thereafter.

Table 15 shows the formulation of concrete of Comparative Example 5-1 and Example 5-1. Table 16 shows the properties of materials that were used. The concrete of Comparative Example 5-1 and Example 5-1 contains water, binder, fine aggregate, coarse aggregate, and chemical admixture. Silica fume premix cement and fly ash were used as the binder. Crushed hard sandstone (Comparative Example 5-1) and air-granulated FNS fine aggregate (Example 5-1) were used as the fine aggregate. Table 17 shows the measurements of the slump flow of Comparative Example 5-1 and Example 5-1. The slump flow was measured in the same manner as in Comparative Example 4-1 and Example 4-1. Example 5-1 showed better flowability than Comparative Example 5-1.

Figure 6:
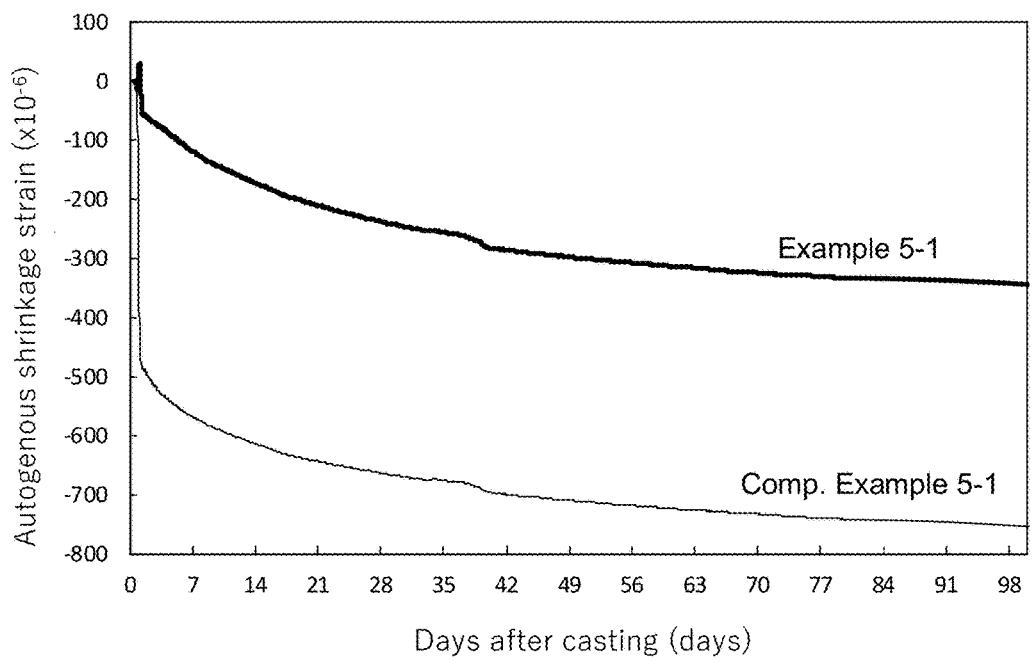
FIG. 6 is a graph showing the temporal change in the autogenous shrinkage strain of Comparative Example 5-1 and Example 5-1.

FIG. 6 shows the autogenous shrinkage strain of Comparative Example 5-1 and Example 5-1. The autogenous shrinkage strain was measured in the same manner as in Comparative Example 4-1 and Example 4-1. Comparative Example 5-1 and Example 5-1 showed autogenous shrinkage immediately after the casting of concrete, but thereafter, increase in the autogenous shrinkage was limited in Example 5-1.

Table 18 shows the formulation of the composition of Comparative Example 6-1 and Example 6-1. Table 19 shows the properties of materials that were used. The BET in Table 18 refers to the measurements that were obtained in accordance with JIS R 1626 "Measuring methods for the specific surface area of fine ceramic powders by gas adsorption using the BET method." The composition of Comparative Example 6-1 and Example 6-1 contains water, binder, fine aggregate, coarse aggregate, and chemical admixture. The binder does not contain cement and consists of blast-furnace

TABLE 15

| Type | W/B (%) | $V_w/(V_B + V_S)$ (%) | Air (%) | Amount of material per unit volume (kg/m³) | | | | | | SP (B × %) | DF (B × %) |
| --- | --- | --- | --- | --- | --- | --- | --- | --- | --- | --- | --- |
| | | | | W | SFPC | FA | S5-1 | S5-2 | G | | |
| Comp. Example 5-1 | 12 | 16 | 1.5 | 135 | 900 | 225 | 659 | — | 549 | 2.3 | 0.04 |
| Example 5-1 | | | | | | | — | 729 | | | |

TABLE 16

| | Name & type | Symbol | Properties | Manufacturer, selling agency etc. | Brand |
| --- | --- | --- | --- | --- | --- |
| | Water | W | Tap water | Nagareyama city, Chiba pref. | — |
| Binder (B) | Silica fume premix cement | SFPC | Density: 3.04 g/cm³, Specific surface area: 5780 cm²/g | TAIHEIYO CEMENT CORPORATION | SFPC |
| | Fly ash (Conforming to Type I) | FA | Density: 2.40 g/cm³, Specific surface area: 5300 cm²/g | Yonden Business Co., Inc. | Finash |
| Fine aggregate (S) | Crushed hard sandstone | S5-1 | Saturated surface dried, Density: 2.61 g/cm³, Water absorption rate: 1.24% | ORES Co., Ltd. | — |
| | Ferronickel slag sand | S5-2 | Saturated surface dried, Density: 2.89 g/cm³, Water absorption rate: 2.91% | Pacific Metals Co., Ltd. | — |
| Coarse aggregate | Crushed stone of hard sandstone | G | Saturated surface dried, Density: 2.62 g/cm³, Water absorption rate: 1.45% | ORES Co., Ltd. | — |
| Chemical admixture | Superplasticizer | SP | Polycarboxylic acid | Sika Ltd. | Sikament 1200N |
| | Defoamer | DF | Ester fatty acid | Sika Ltd. | Sika antiform W |

TABLE 17

| Type | slump Flow (cm) | 50 cm slump flow time (s) | Concrete temp. (° C.) | Room temp. (° C.) |
| --- | --- | --- | --- | --- |
| Comp. Example 5-1 | 60.3 | 26.7 | 28.5 | 20.9 |
| Example 5-1 | 79.5 | 5.9 | 30 | 21.2 | slag fine powder, fly ash, silica fume, and expansive additive. Crushed hard sandstone (Comparative Example 6-1) and air-granulated FNS fine aggregate (Example 6-1) were used as the fine aggregate. Table 17 shows the measurements of the slump flow of Comparative Example 6-1 and Example 6-1. The slump flow was measured in the same manner as in Comparative Example 4-1 and Example 4-1. Example 6-1 showed better flowability than Comparative Example 6-1.

TABLE 18

| Type | W/B (%) | $V_w/(V_B + V_S)$ (%) | Air (%) | Amount of material per unit volume (kg/m³) | | | | | | | | SF (B × %) | DF (B × %) |
| --- | --- | --- | --- | --- | --- | --- | --- | --- | --- | --- | --- | --- | --- |
| | | | | W | BF | SF | FA | EX | S6-1 | S6-2 | G | | |
| Comp. Example 6-1 | 16 | 15 | 3.5 | 89 | 307 | 84 | 168 | 20 | 943 | — | 809 | 2.25 | 0.002 |
| Example 6-1 | | | | | | | | | — | 1073 | | | |

TABLE 19

| | Name & type | Symbol | Properties | Manufacturer, selling agency etc. | Brand |
|---|---|---|---|---|---|
| | Water | W | Tap water | Nagareyama city, Chiba pref. | — |
| Binder (B) | blast-furnace slag fine powder | BF | Density: 2.89 g/cm³, Specific surface area: 4630 cm²/g | DC CO., LTD. | Cerament A |
| | Fly ash (Conforming to Type I) | FA | Density: 2.40 g/cm³, Specific surface area: 5300 cm²/g | Yonden Business Co., Inc. | Finash |
| | Silica fume | SF | Density: 2.20 g/cm³, BET specific surface area: 200000 cm²/g | TOMOE Engineering Co., Ltd. | EFACO |
| | Expansive additive | EX | Density: 3.19 g/cm³, Specific surface area: 4970 m²/g | Taiheiyo Materials Corporation. | NEX |
| Fine aggregate (S) | Crushed hard sandstone | S6-1 | Saturated surface dried, Density: 2.61 g/cm³, Water absorption rate: 1.24% | ORES Co., Ltd. | — |
| | Ferronickel slag sand | S6-2 | Saturated surface dried, Density: 2.89 g/cm³, Water absorption rate: 2.91% | Pacific Metals Co., Ltd. | — |
| Coarse aggregate | Crushed stone of hard sandstone | G | Saturated surface dried, Density: 2.62 g/cm³, Water absorption rate: 1.45% | ORES Co., Ltd. | — |
| Chemical admixture | Superplasticizer | SP | polycarboxylic acid | Sika Ltd. | Sikament 1200N |
| | Defoamer | DF | ester fatty acid | Sika Ltd. | Sika antiform W |

TABLE 20

| Type | slump Flow (cm) | 50 cm slump flow time (s) | Concrete temp. (° C.) | Room temp. (° C.) |
|---|---|---|---|---|
| Comp. Example 6-1 | 55.5 | 111 | 20.7 | 17.2 |
| Example 6-1 | 75.5 | 9.9 | 18.5 | 18.0 |

Figure 7:
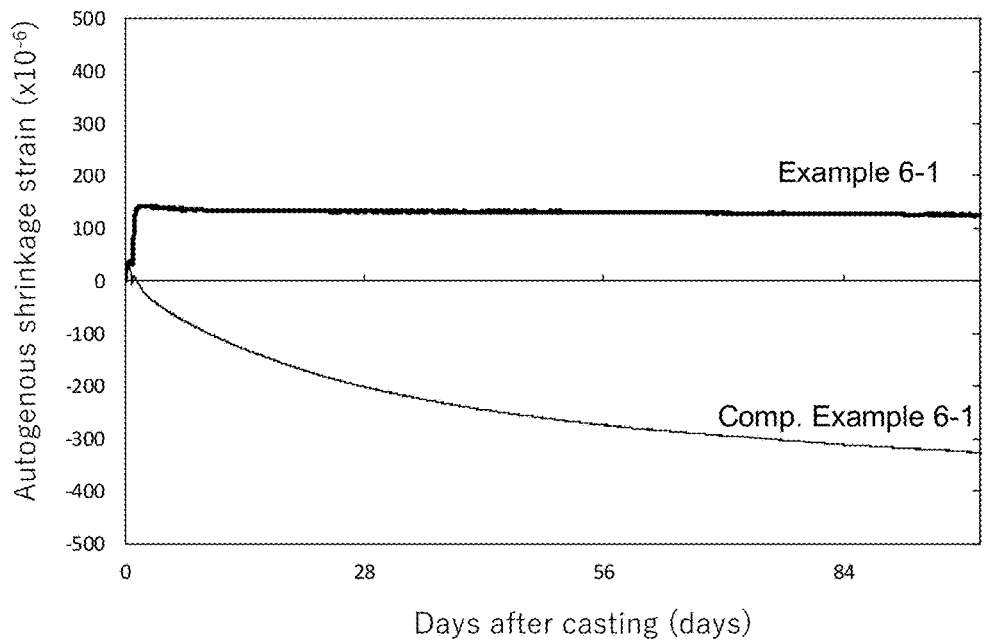
FIG. 7 is a graph showing the temporal change in the autogenous shrinkage strain of Comparative Example 6-1 and Example 6-1.

FIG. 7 shows the autogenous shrinkage strain of Comparative Example 6-1 and Example 6-1. The autogenous shrinkage strain was measured in the same manner as in Comparative Example 4-1 and Example 4-1. Comparative Example 6-1 showed an increase in the autogenous shrinkage from immediately after the casting of the composition, while the composition of Example 6-1 was on the expansion side after the casting rather than on the shrinkage side and showed little shrinkage thereafter.

As described above, use of air-granulated FNS fine aggregate or artificial light-weight fine aggregate enables both the improvement of flowability and the limitation of autogenous shrinkage strain. In addition, in the case of air-granulated FNS fine aggregate, air-granulated FNS fine aggregate that contains almost no fine powder having particle diameters of less than 300 μm improves the flowability and limits the autogenous shrinkage strain to a greater degree. Thus, some properties of natural fine aggregates that are generally used for concrete were evaluated in addition to these fine aggregates. The fine aggregates that were analyzed were the six types shown below:

A: Air-granulated FNS fine aggregate (substantially consisting of aggregate having particle diameters of 5 mm or less and containing fine powder having particle diameters of less than 300 μm. Referred to as FNS5A.)

B: Air-granulated FNS fine aggregate (substantially consisting of aggregate having particle diameters of 5 mm or less and almost no fine powder having particle diameters of less than 300 μm. Referred to as FNS5-0.3.)

C: Artificial light-weight fine aggregate (using artificial fine aggregate that was produced by crushing, granulating, and firing shale (Mesalite manufactured by Nippon Mesalite Industry Co., Ltd.))

D: Crushed limestone

E: Crushed andesite

F: Crushed hard sandstone

The properties that were evaluated were the BET specific surface area, the porosity, and the distribution of the volume of pores. The BET specific surface area is a value obtained by dividing the surface area of fine aggregate including the surfaces of pores by the weight of the fine aggregate and was measured by a nitrogen gas adsorption method. The porosity is a value (%) obtained by dividing the pore volume of the fine aggregate by the volume of the fine aggregate including the pores and was measured by a mercury intrusion method. The porosity is calculated as $(1-\rho 1/\rho 2)$, where w1 (g) is the weight of a sealed empty cell, w2 (g) is the weight of a sealed cell filled with mercury, w3 (g) is the weight of the sealed cell and an agent, w4 (g) is the weight of the sealed cell filled with mercury and the sample, v1 (mL) is the pore volume at 60000 psi (about 414 MPa), v2 (mL) is the total volume of the cell, v3 is the volume of the cell excluding the sample, v4 is the bulk volume of the sample, v5 is the volume of the sample, $\rho 1$ is bulk density, and $\rho 2$ is real density, where $\rho 1=(w3-w1)/v4$, $\rho 2=(w3-w1)/v5$, $v4=v2-v3$, $v5=v4-v1$, $v2=(w2-w1)/\text{density of mercury}$, and $v3=(w4-w3)/\text{density of mercury}$. The volume of pores is a value obtained by dividing the pore volume by the weight of the fine aggregate and was measured by the mercury intrusion method. The volume of pores was obtained in the form of two indexes, that is, a differential pore volume and a log differential pore volume. The former is the volume of pores obtained for each pore radius. The latter is obtained by making a plot of dV/d(log D) vs. the average of each pore diameter section, where ΔV is the differential of differential pore volume, and D is pore diameter. The latter is similar to the value obtained by differentiating the graph of a cumulative distribution of pore volume that can be directly obtained from the nitrogen gas adsorption method. The log differential pore volume is correlated to the differential pore volume. The pore radius is the radius of a pore that is exposed on the surface of the fine aggregate and is defined as a radius of an equivalent circle having the same area.

Figure 8:
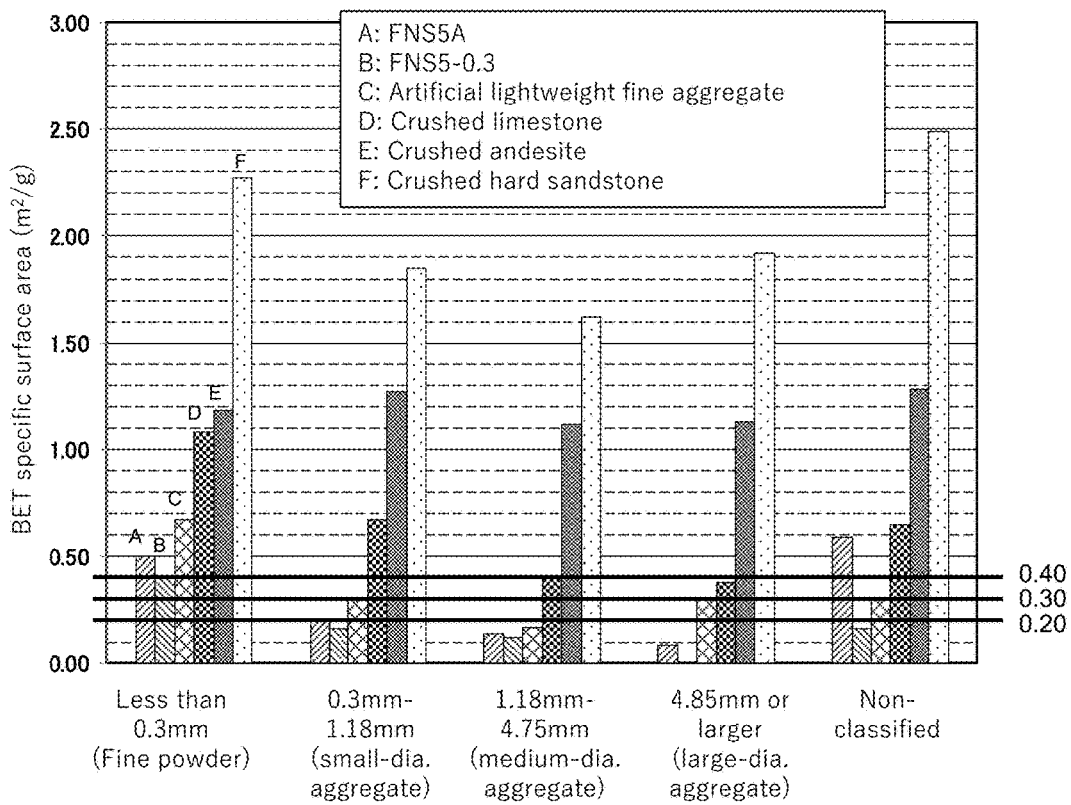
FIG. 8 is a graph showing the relationship between the BET specific surface area and the particle diameter classes of fine aggregate.

FIG. 8 shows the relationship between the BET specific surface area of the fine aggregate and the particle diameter classes. The fine aggregate was classified into particle diameters of less than 300 μm, 300 μm or more and less than 1.18 mm, 1.18 mm or more and less than 4.75 mm, and 4.75 mm or more and 5 mm or less. The classification was conducted using metal wire cloths having predetermined nominal mesh sizes that are stipulated by JIS-Z8801-1:2019 "Test sieves—Part 1: Test sieves of metal wire cloth." Specifically, fine aggregate having particle diameters of 4.75 mm or more and 5 mm or less means fine aggregate that remained in a metal wire cloth having a nominal mesh size of 4.75 mm after passing the fine aggregate through the metal wire cloth. Fine aggregate having particle diameters of 1.18 mm or more and less than 4.75 mm means fine aggregate that passed through a metal wire cloth having a nominal mesh size of 4.75 mm and that remained in a metal wire cloth having a nominal mesh size of 1.18 mm. Fine aggregate having particle diameters of 300 μm or more and less than 1.18 mm means fine aggregate that passed through a metal wire cloth having a nominal mesh size of 1.18 mm and that remained in a metal wire cloth having a nominal mesh size of 300 μm. Fine aggregate having particle diameters of less than 300 μm (fine powder) means fine aggregate that passed through the metal wire cloth having a nominal mesh size of 300 μm. In other words, the particle diameters in the classification correspond to the nominal mesh sizes of metal wire cloth of JIS-Z8801-1:2019. FIG. 8 also shows the BET specific surface area of unclassified fine aggregate. In the following description, fine aggregate having particle diameters of less than 300 μm may be referred to as fine powder, fine aggregate having particle diameters of 300 μm or more and less than 1.18 mm may be referred to as small-diameter aggregate, fine aggregate having particle diameters of 1.18 mm or more and less than 4.75 mm may be referred to as medium-diameter aggregate, and fine aggregate having particle diameters of 4.75 mm or more and 5 mm or less may be referred to as large-diameter aggregate.

Air-granulated FNS fine aggregates A and B and artificial light-weight fine aggregate C (these are referred to as artificial fine aggregates A to C) have smaller BET specific surface areas than crushed limestone D, crushed andesite E, and crushed hard sandstone F (these are referred to as natural fine aggregates D to F). Comparing FIGS. 1A and 1B and FIG. 8, the BET specific surface area and the flowability are generally negatively correlated. Furthermore, the small-diameter aggregate, medium-diameter aggregate, and large-diameter aggregate of artificial fine aggregates A to C, and particularly FNS fine aggregate B, have significantly smaller BET specific surface areas than those of natural fine aggregates D to F. From this, fine aggregate, of which the small-diameter aggregate, the medium-diameter aggregate, and the large-diameter aggregate each have a BET specific surface area of 0.4 (m$^2$/g) or less (artificial fine aggregates A to C), is believed to exhibit excellent flowability. Furthermore, fine aggregate, of which the small-diameter aggregate, the medium-diameter aggregate, and the large-diameter aggregate each have a BET specific surface area of 0.2 (m$^2$/g) or less (artificial fine aggregates A to C), is believed to exhibit even greater flowability.

Comparing FIG. 2 and FIG. 8, FNS fine aggregate A that has a small BET specific surface area is believed to have the effect of limiting the autogenous shrinkage, and comparing FIGS. 3 and 4 and FIG. 8, FNS fine aggregate B that has a smaller BET specific surface area than FNS fine aggregate A shows a greater effect of limiting the autogenous shrinkage than FNS fine aggregate A. Accordingly, there is believed to be a substantially negative correlation between the BET specific surface area and the effect of limiting autogenous shrinkage. When the small-diameter aggregate, the medium-diameter aggregate and the large-diameter aggregate each have a BET specific surface area that is preferably 0.4 (m$^2$/g) or less, and more preferably 0.3 (m$^2$/g) or less (artificial fine aggregates A to C), a greater effect of limiting the autogenous shrinkage is expected. In addition, comparing FNS fine aggregates A and B, the fine aggregate, of which the small-diameter aggregate, the medium-diameter aggregate, and the large-diameter aggregate each have a BET specific surface area that is 0.20 (m$^2$/g) or less (FNS fine aggregate B), is believed to have a still greater effect of limiting the autogenous shrinkage.

Figure 9:
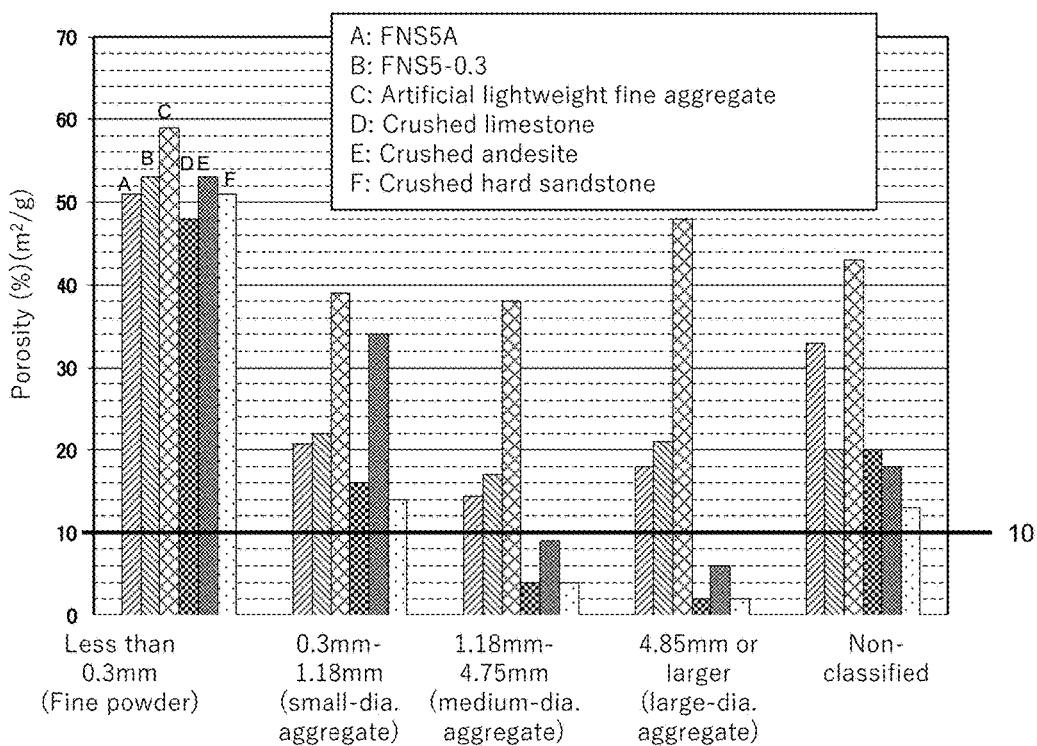
FIG. 9 is a graph showing the relationship between the porosity and the particle diameter classes of fine aggregate.

FIG. 9 shows the relationship between the porosity of the fine aggregate and the particle diameter classes. The porosity of the fine powder was about the same level regardless of the kind of fine aggregate. On the other hand, there were definite differences between artificial fine aggregates A to C and natural fine aggregates D to F for the porosities of the medium-diameter aggregate and the large-diameter aggregate. In addition, the porosity of the small-diameter aggregate is between the porosity of the fine powder and the porosity of the medium—and large-diameter aggregates. This means that the difference in porosity in the medium- and large-diameter aggregates mainly contributes to the improvement of flowability and the limitation of autogenous shrinkage. Specifically, fine aggregate, of which the medium-diameter aggregate and the large-diameter aggregate each have porosity of 10% or more is believed to show both good flowability and the effect of limiting the autogenous shrinkage. Such fine aggregate may have small-diameter aggregate having porosity of 10% or more.

Figure 10A:
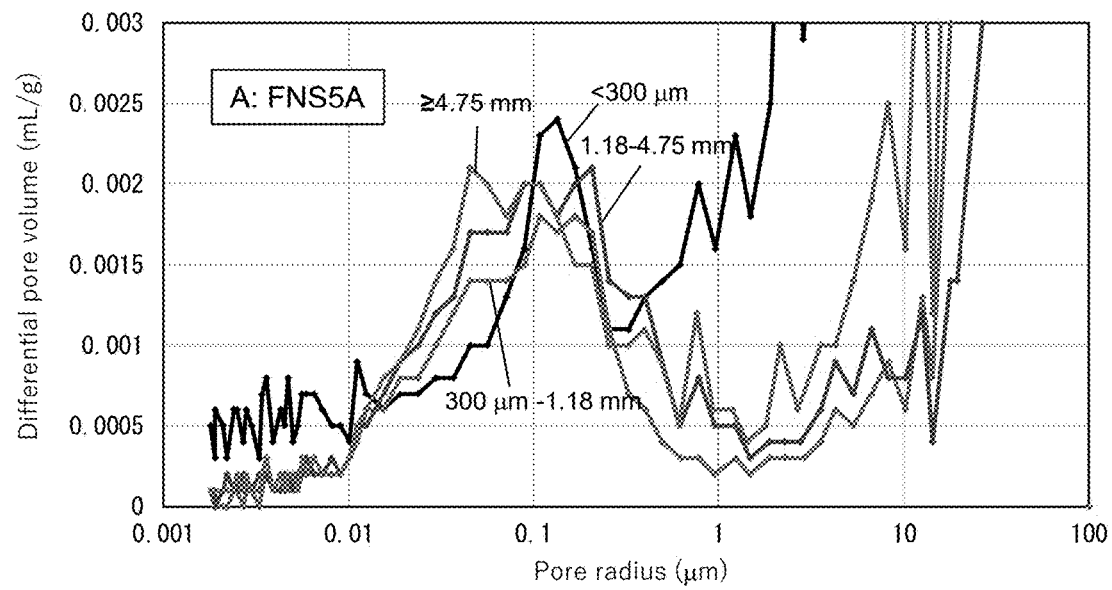
FIG. 10A is a graph showing the distribution of the differential pore volume of FNS fine aggregate A.
Figure 10B:
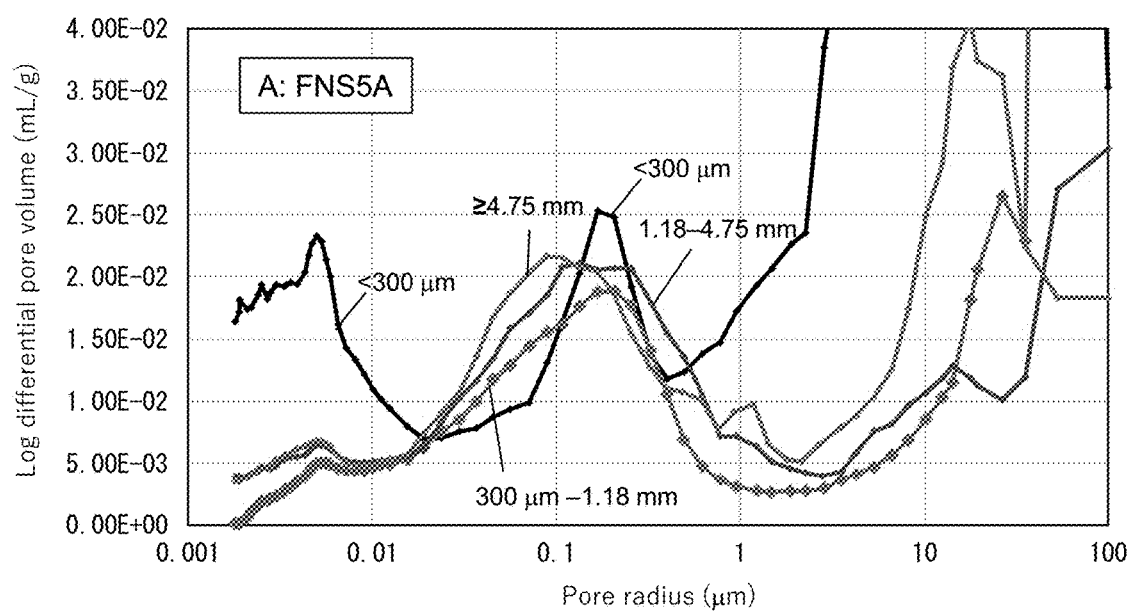
FIG. 10B is a graph showing the distribution of the log differential pore volume of FNS fine aggregate A.
Figure 11A:
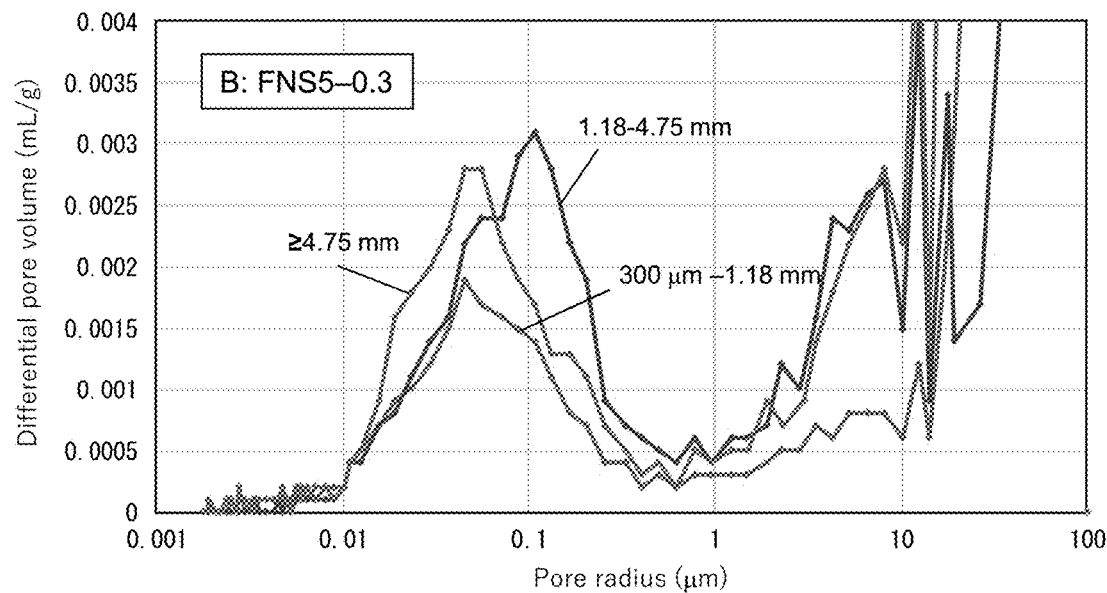
FIG. 11A is a graph showing the distribution of the differential pore volume of FNS fine aggregate B.
Figure 11B:
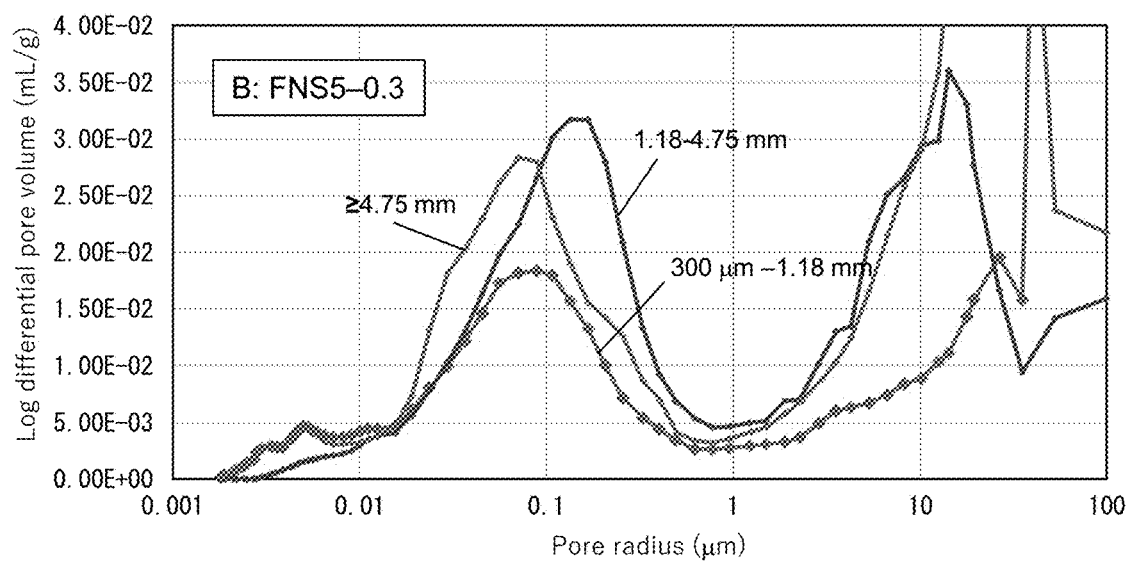
FIG. 11B is a graph showing the distribution of the log differential pore volume of FNS fine aggregate B.
Figure 12A:
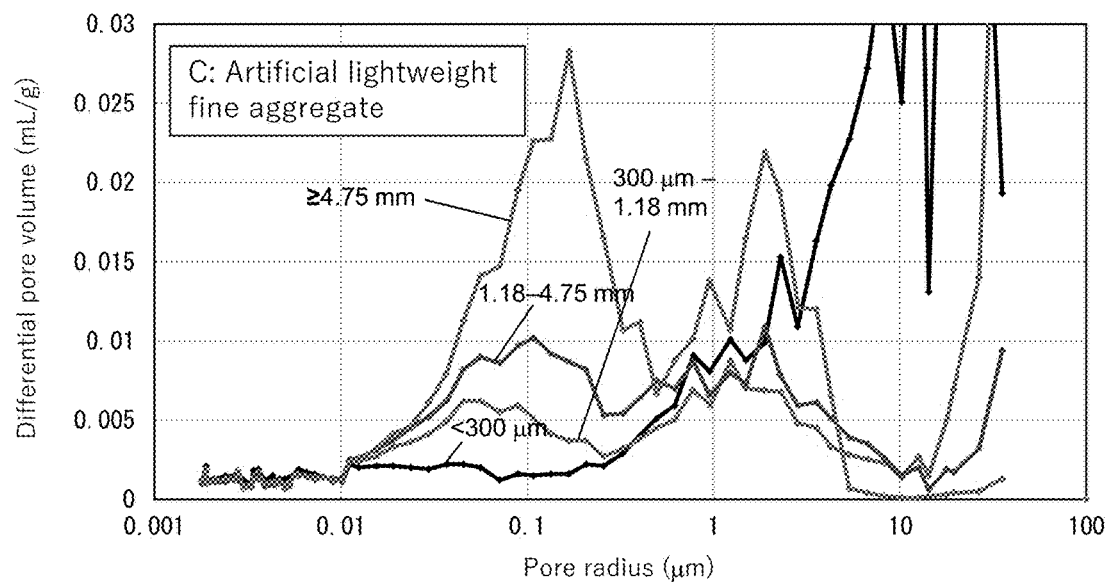
FIG. 12A is a graph showing the distribution of the differential pore volume of artificial light-weight fine aggregate C.
Figure 12B:
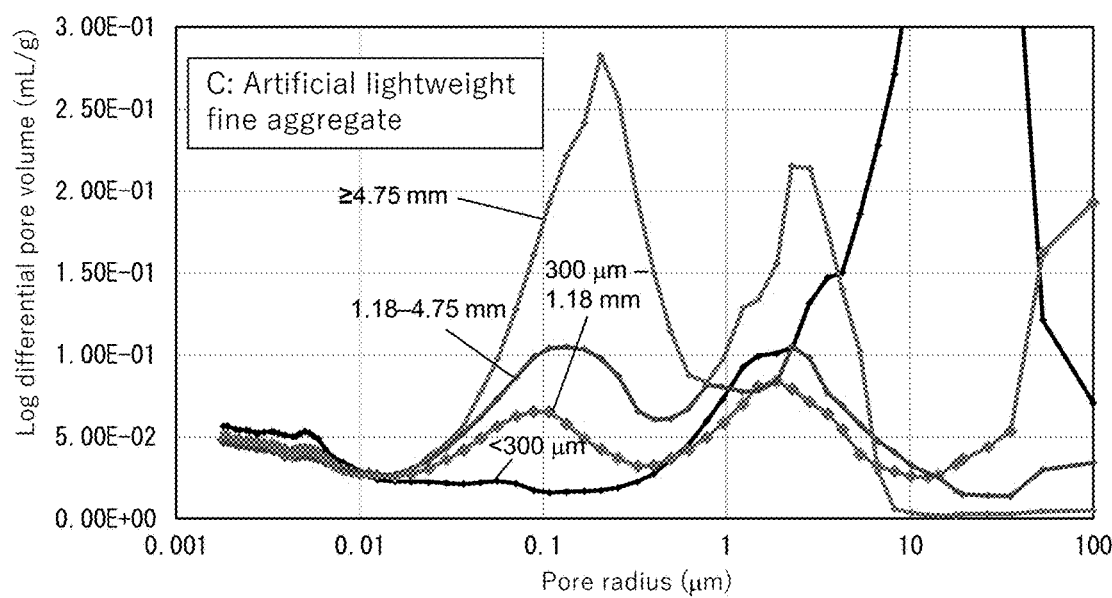
FIG. 12B is a graph showing the distribution of the log differential pore volume of artificial light-weight fine aggregate C.
Figure 13A:
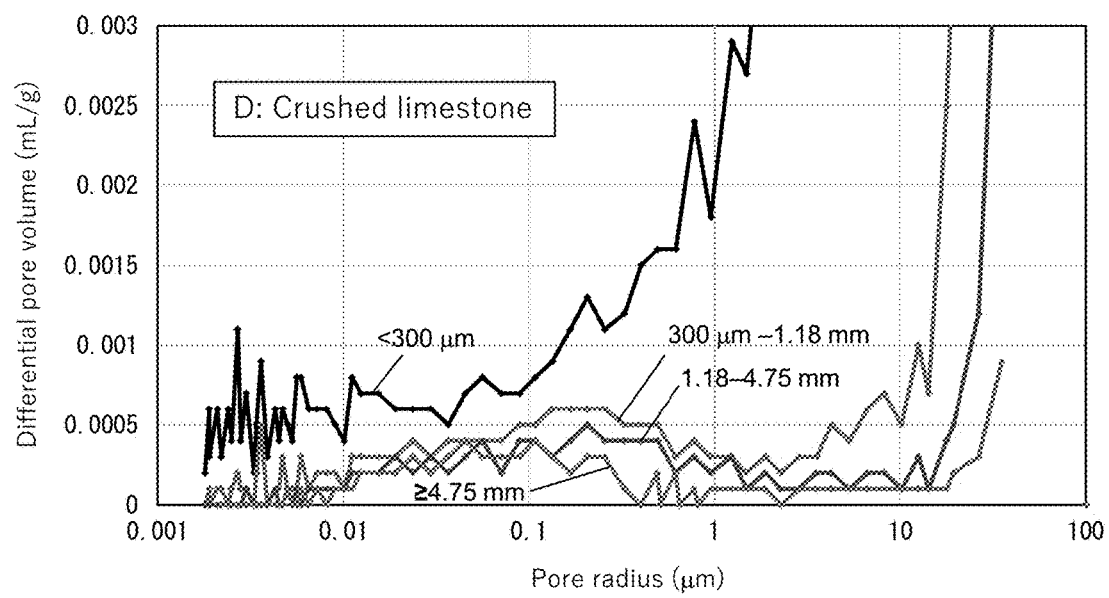
FIG. 13A is a graph showing the distribution of the differential pore volume of crushed limestone D.
Figure 13B:
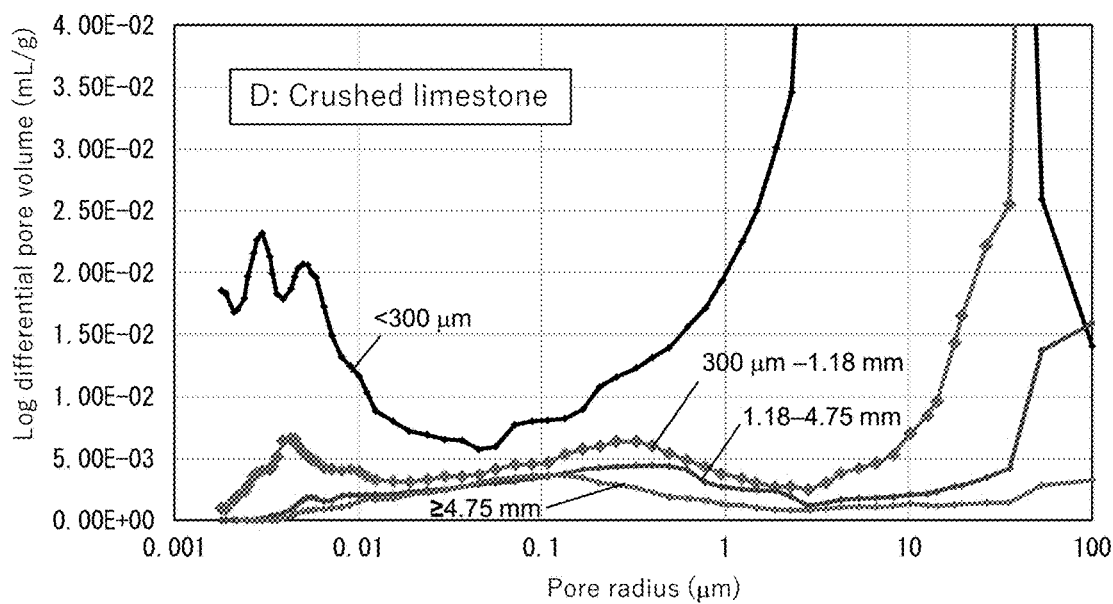
FIG. 13B is a graph showing the distribution of the log differential pore volume of crushed limestone D.
Figure 14A:
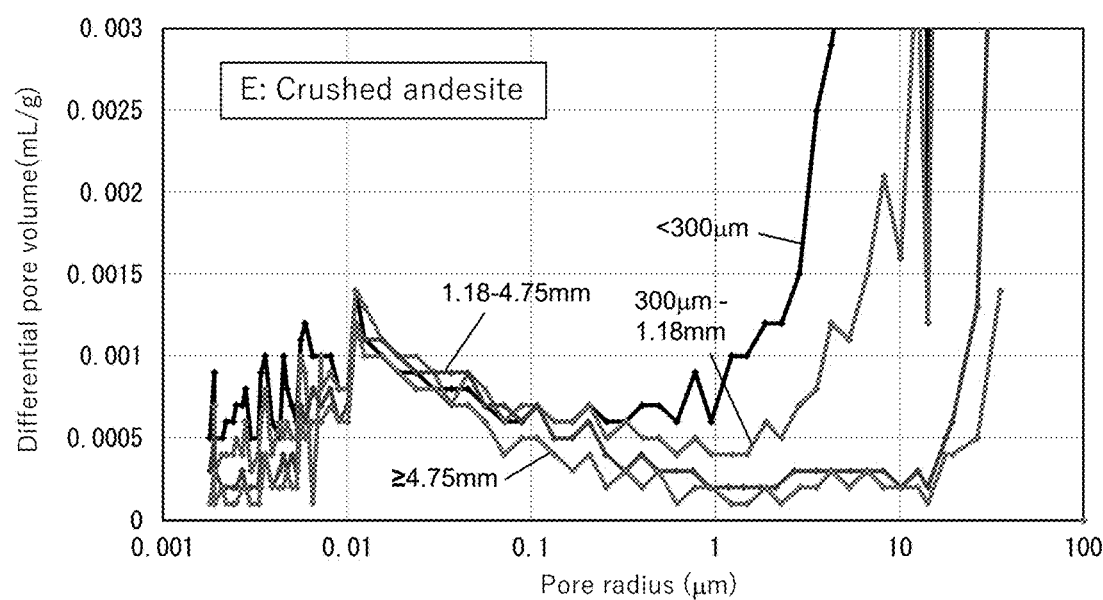
FIG. 14A is a graph showing the distribution of the differential pore volume of crushed andesite E.
Figure 14B:
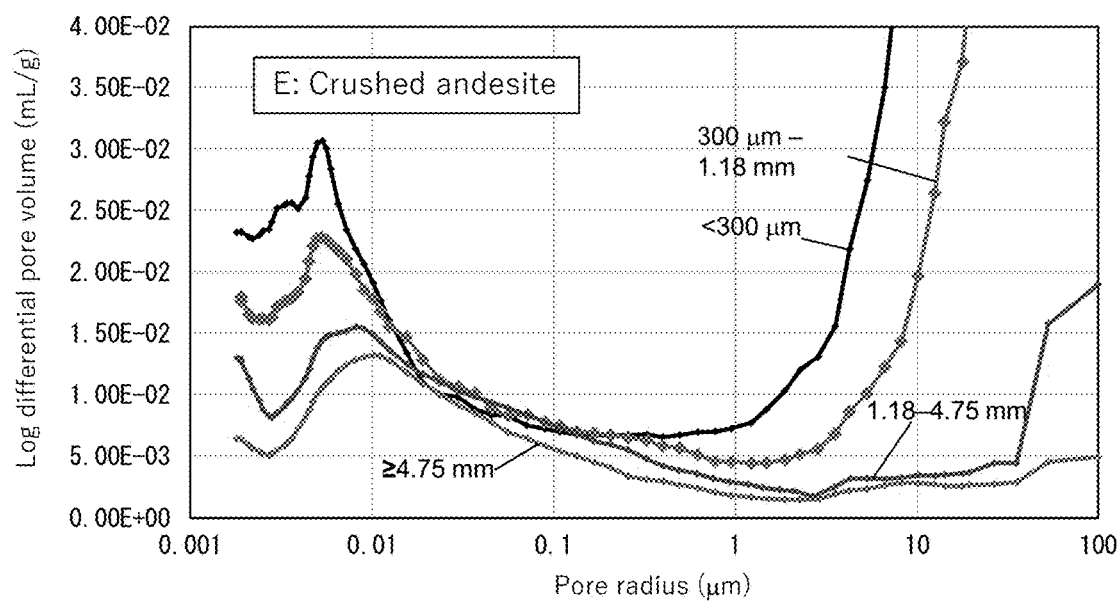
FIG. 14B is a graph showing the distribution of the log differential pore volume of crushed andesite E.
Figure 15A:
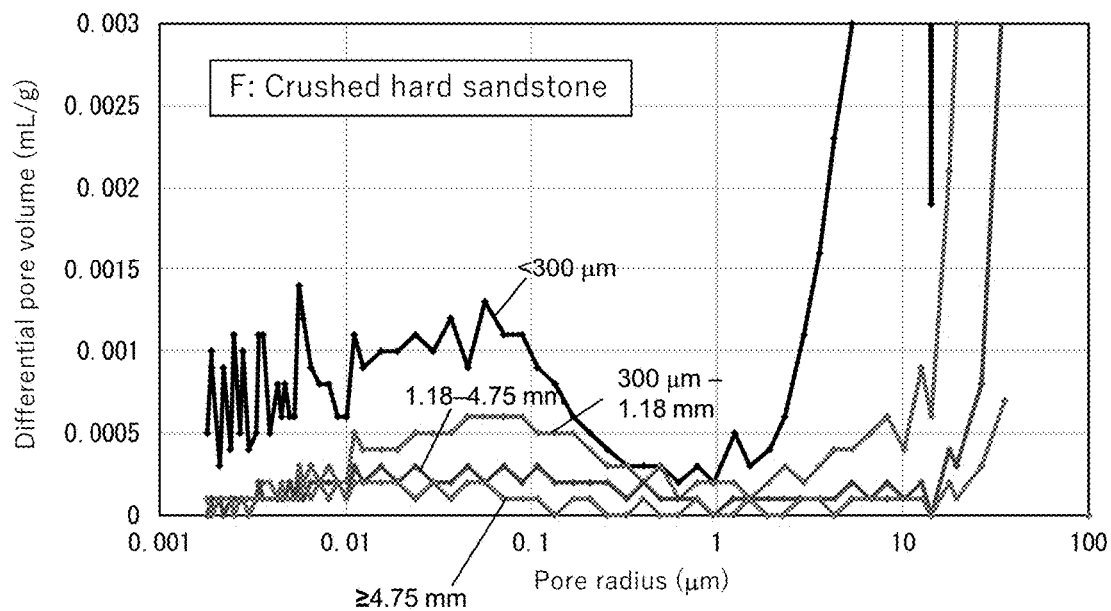
FIG. 15A is a graph showing the distribution of the differential pore volume of crushed hard sandstone F.
Figure 15B:
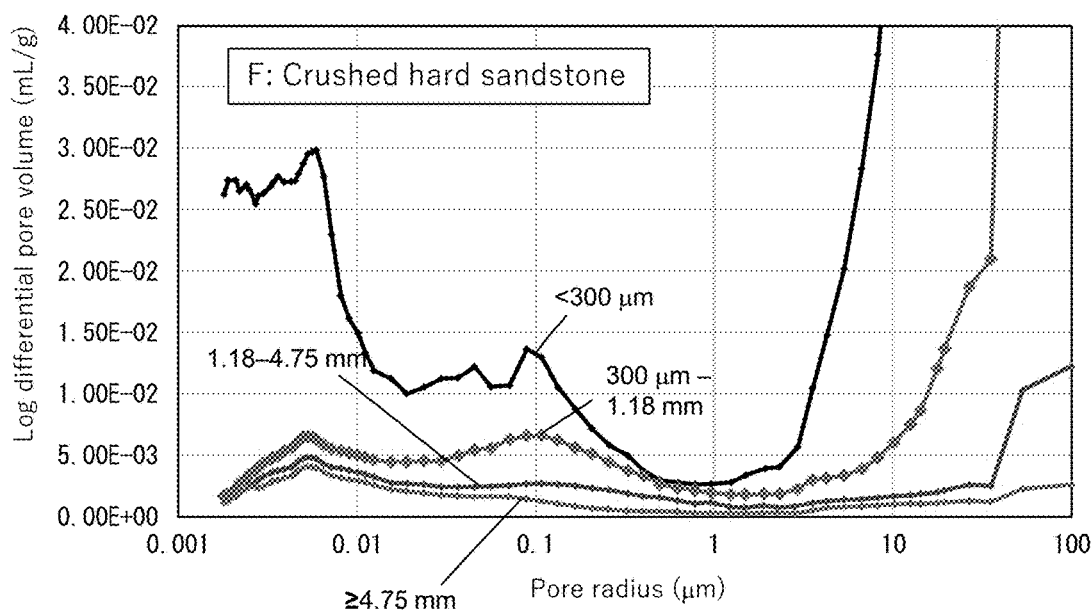
FIG. 15B is a graph showing the distribution of the log differential pore volume of crushed hard sandstone F.

FIG. 10A shows the differential pore volume of FNS fine aggregate A, and FIG. 10B shows the log differential pore volume of FNS fine aggregate A. Similarly, FIG. 11A to FIG. 15B show the differential pore volume and the log differential pore volume of other fine aggregates B to F. The data of 300 μm or less of FNS fine aggregate B are not illustrated because FNS fine aggregate B contains almost no fine powder. Table 21 shows a pore radius having the largest differential pore volume in the range of pore radii from 0.1 to 10 μm for each particle diameter class of the fine aggregate. Table 22 shows a pore radius having the largest log differential pore volume in the range of pore radii from 0.1 to 10 μm for each particle diameter class of the fine aggregate. Referring to Table 21, artificial fine aggregates A to C have the largest differential pore volume around pore radii from 0.03 to 0.3 μm for each particle diameter class, but natural fine aggregates D to F have a particle diameter class that does not have the largest value in this range. Furthermore, crushed limestone D and crushed hard sandstone F have a particle diameter class having no clear peak. From the above, fine aggregate, of which the small-diameter aggregate, the medium-diameter aggregate, and the large-diameter aggregate each have a pore radius having the largest differential pore volume in the range from 0.03 to 0.3 μm out of the range of pore radii from 0.01 to 1 μm (artificial fine aggregates A to C), is believed to exhibit both good flowability and the effect of limiting the autogenous shrinkage. Referring to Table 22, artificial fine aggregates A to C have the largest log differential pore volume around pore radii from 0.06 to 0.3 μm for each particle diameter class, but natural fine aggregates D to F have a particle diameter class that does not have the largest value in this range. From the above, fine aggregate, of which the small-diameter aggregate, the medium-diameter aggregate, and the large-diameter aggregate each have a pore radius having the largest differential pore volume in the range from 0.06 to 0.3 μm out of the range of pore radii from 0.01 to 1 μm (artificial fine aggregates A to C), is believed to show both good flowability and the effect of limiting the autogenous shrinkage.

TABLE 21

| Type of fine aggregate | Particle dia. class (mm) | | | Remarks |
|---|---|---|---|---|
| | 0.3-1.18 | 1.18-4.75 | 4.75-5 | |
| A: FNS5A | 0.108-0.1675 | 0.2064 | 0.0454 | The largest differential pore volume is from 0.03 to 0.3 μm for each particle diameter class |
| B: FNS5-0.3 | 0.0455 | 0.108 | 0.0455-0.0563 | |
| C: Artificial light weight fine aggregate | 0.0455-0.0562 | 0.108 | 0.1675 | |
| D: Crushed limestone | No clear peak (0.1675-0.256) | No clear peak (0.2604) | No clear peak (0.0455-0.1089) | Has a particle diameter class without the largest value in the range from 0.03 to 0.3 μm |
| E: Crushed andesite | 0.0111 | 0.0111 | 0.0101 | |
| F: Crushed hard sandstone | No clear peak (0.0562-0.0891) | No clear peak (0.0111-0.1079) | No clear peak (0.0124-0.0562) | |

TABLE 22

| Type of fine aggregate | Particle dia. class (mm) | | | Remarks |
|---|---|---|---|---|
| | 0.3-1.18 | 1.18-4.75 | 4.75-5 | |
| A: FNS5A | 0.1675-0.2064 | 0.1338 | 0.0888 | The largest differential pore volume is in the range from 0.06 to 0.3 mm for each particle diameter class |
| B: FNS5-0.3 | 0.089 | 0.1338-0.1673 | 0.0713 | |
| C: Artificial light weight fine aggregate | 0.089-0.1079 | 0.1338 | 0.2062 | |
| D: Crushed limestone | 0.256-0.3271 | 0.3265-0.4938 | 0.108 | Has a particle diameter class without the largest value in the range from 0.06 to 0.3 mm |
| E: Crushed andesite | 0.010 | 0.010 | 0.0101 | |
| F: Crushed hard sandstone | 0.0891-0.1081 | No clear peak (0.1079) | No clear peak (0.01) | |

As described above, air-granulated FNS fine aggregate or artificial light-weight fine aggregate is used as the fine aggregate in the present invention. The air-granulated FNS fine aggregate achieves good flowability with a small amount of water due to the "internal curing effect." The autogenous shrinkage is also limited due to the small amount of water. For this reason, the composition containing aggregate, binder, and water of the present invention has a significantly smaller ratio $V_W/(V_B+V_S)$, which is 15% or more and 26% or less, than a conventional composition, where $V_W/(V_B+V_S)$ is a ratio of the volume of water to the sum of the volume of the binder and the volume of aggregate that is classified into particle diameters of 5 mm or less (fine aggregate). $V_W/(V_B+V_S)$ of the air-granulated FNS fine aggregate is 15% or more and 25% or less based on the above examples. The artificial light-weight fine aggregate has properties similar to those of the air-granulated FNS fine aggregate, and $V_W/(V_B+V_S)$ is 23% or more and 26% or less based on the above examples.

The composition containing aggregate, binder, and water of the present invention has been described based on the examples. According to the present invention, it is possible for mortar and concrete having various compositions, as well as for a composition that does not contain cement, to achieve both the flowability in the fresh state and the limitation of the autogenous shrinkage at a high level through the use of fine aggregate having specific properties. Furthermore, the present invention is not limited to the examples described above. For example, the strength of concrete is not limited, and the present invention can be applied to super-high-strength concrete, high-strength concrete, and general concrete.

Although preferred examples of the present invention have been shown and described in detail, it should be understood that various changes and modifications may be made without departing from the spirit or scope of the appended claims.

What is claimed is:

1. A composition containing binder, aggregate, and water, wherein the aggregate contains:
   small-diameter aggregate classified into particle diameters of 300 μm or more and less than 1.18 mm;
   medium-diameter aggregate classified into particle diameters of 1.18 mm or more and less than 4.75 mm; and
   large-diameter aggregate classified into particle diameters of 4.75 mm or more and 5 mm or less; wherein
   a ratio of volume of water to a sum of volume of the binder and volume of aggregate having particle diameters of 5 mm or less is 15% or more and 26% or less, and the small-diameter aggregate, the medium-diameter aggregate, and the large-diameter aggregate each have a BET specific surface area of 0.4 (m$^2$/g) or less.

2. The composition according to claim 1, wherein the small-diameter aggregate, the medium-diameter aggregate, and the large-diameter aggregate each have a BET specific surface area of 0.3 (m$^2$/g) or less.

3. The composition according to claim 1, wherein the small-diameter aggregate, the medium-diameter aggregate, and the large-diameter aggregate each have a BET specific surface area of 0.2 (m$^2$/g) or less.

4. The composition according to claim 1, wherein the aggregate contains substantially no fine powder having particle diameters of less than 300 μm.

5. The composition according to claim 1, wherein the aggregate is air-granulated ferronickel slag fine aggregate.

6. The composition according to claim 1, wherein the aggregate is air-granulated ferronickel slag fine aggregate and contains substantially no fine powder having particle diameters of less than 300 μm.

7. The composition according to claim 5, wherein a ratio of volume of the water to a sum of volume of the binder and volume of aggregate having particle diameters of 5 mm or less is 16% or more and 25% or less.

8. The composition according to claim 1, wherein the aggregate is artificial light-weight fine aggregate.

9. The composition according to claim 8, wherein a ratio of volume of the water to a sum of volume of the binder and volume of aggregate having particle diameters of 5 mm or less is 23% or more and 26% or less.

10. A composition containing binder, aggregate, and water, wherein the composition contains:
   medium-diameter aggregate classified into particle diameters of 1.18 mm or more and less than 4.75 mm; and
   large-diameter aggregate classified into particle diameters of 4.75 mm or more and 5 mm or less; wherein
   a ratio of volume of water to a sum of volume of the binder and volume of aggregate having particle diameters of 5 mm or less is 15% or more and 26% or less, and the medium-diameter aggregate and the large-diameter aggregate each have porosity of 10% or more.

11. The composition according to claim 10, wherein small-diameter aggregate classified into particle diameters of 300 μm or more and 1.18 mm or less has porosity of 10% or more.

12. The composition according to claim 11, wherein the small-diameter aggregate, the medium-diameter aggregate, and the large-diameter aggregate each have a BET specific surface area of 0.4 (m²/g) or less.

13. A composition containing binder, aggregate, and water, wherein the aggregate contains:
   small-diameter aggregate classified into particle diameters of 300 μm or more and less than 1.18 mm;
   medium-diameter aggregate classified into particle diameters of 1.18 mm or more and less than 4.75 mm; and
   large-diameter aggregate classified into particle diameters of 4.75 mm or more and 5 mm or less; wherein
   a ratio of volume of water to a sum of volume of the binder and volume of aggregate having particle diameters of 5 mm or less is 15% or more and 26% or less, and
   in a range of pore radii from 0.01 to 1 μm, the small-diameter aggregate, the medium-diameter aggregate, and the large-diameter aggregate each have a pore radius having a largest differential pore volume in a range from 0.03 to 0.3 μm.

14. A composition containing binder, aggregate, and water, wherein the aggregate contains:
   small-diameter aggregate classified into particle diameters of 300 μm or more and less than 1.18 mm;
   medium-diameter aggregate classified into particle diameters of 1.18 mm or more and less than 4.75 mm; and
   large-diameter aggregate classified into particle diameters of 4.75 mm or more larger and 5 mm or less; wherein
   a ratio of volume of water to a sum of volume of the binder and volume of aggregate having particle diameters of 5 mm or less is 15% or more and 26% or less, and
   in a range of pore radii from 0.01 to 1 μm, the small-diameter aggregate, the medium-diameter aggregate, and the large-diameter aggregate each have a pore radius having a largest log differential pore volume in a range from 0.06 to 0.3 μm.

* * * * *